United States Patent
Wolfe

(10) Patent No.: US 9,729,663 B2
(45) Date of Patent: Aug. 8, 2017

(54) DYNAMIC/SHARED PMTU CACHE

(71) Applicant: Limelight Networks, Inc., Tempe, AZ (US)

(72) Inventor: Jason L. Wolfe, Gilbert, AZ (US)

(73) Assignee: Limelight Networks, Inc., Tempe, AZ (US)

(*) Notice: Subject to any disclaimer, the term of this patent is extended or adjusted under 35 U.S.C. 154(b) by 358 days.

(21) Appl. No.: 14/499,578

(22) Filed: Sep. 29, 2014

(65) Prior Publication Data

US 2016/0094621 A1 Mar. 31, 2016

(51) Int. Cl.
*G06F 15/16* (2006.01)
*H04L 29/08* (2006.01)

(52) U.S. Cl.
CPC ........ *H04L 67/2842* (2013.01); *H04L 67/288* (2013.01)

(58) Field of Classification Search
CPC ... H04L 67/10; H04L 67/288; H04L 67/2842; H04L 67/42
USPC ................ 709/203, 200, 217, 226
See application file for complete search history.

(56) References Cited

U.S. PATENT DOCUMENTS

| | | |
|---|---|---|
| 7,111,061 B2 | 9/2006 | Leighton et al. |
| 7,830,896 B2 | 11/2010 | Srivastava |
| 7,945,689 B2 | 5/2011 | Painter et al. |
| 8,014,404 B2 | 9/2011 | Eki et al. |
| 8,098,589 B2 | 1/2012 | Chandra et al. |
| 8,180,896 B2 | 5/2012 | Sakata et al. |
| 8,341,278 B2 | 12/2012 | Tewari et al. |
| 8,645,539 B2 | 2/2014 | McCarthy et al. |
| 8,792,510 B2 | 7/2014 | Yong et al. |
| 2011/0082982 A1* | 4/2011 | Harvell ............ G06F 17/30902 711/122 |
| 2014/0233565 A1* | 8/2014 | Mahapatra ............ H04L 45/74 370/392 |
| 2015/0288603 A1* | 10/2015 | Kandasamy ............ H04L 45/74 370/392 |

(Continued)

OTHER PUBLICATIONS

Mukhtar R. et al, "A client side measurement scheme for request routing in virtual open content delivery networks", Retrieved on Jan. 28, 2015 from http://ieeexplore.ieee.org/xpl/articleDetails.jsp?tp=&arnumber=1203704, Apr. 9-11, 2003, 8 pages, Performance, Computing, and Communications Conference, 2003. Conference Proceedings of the 2003 IEEE International.

(Continued)

*Primary Examiner* — El Hadji Sall
(74) *Attorney, Agent, or Firm* — Snell & Wilmer L.L.P.

(57) ABSTRACT

Methods, systems and computer program products for delivering content objects over the Internet are disclosed. Use of a packet size digest allows for look-up of known or discovered maximum packet sizes for network paths to various receiving systems by servers within one or more points of presence of a content delivery network, such that the packet size information can be advantageously re-used by the multiple servers to reduce delays associated with lost packets and time spent determining a path maximum packet size or maximum transmission unit by each of the multiple servers within the point of presence as they transmit content objects over the Internet.

20 Claims, 16 Drawing Sheets

(56) References Cited

U.S. PATENT DOCUMENTS

2015/0381509 A1* 12/2015 Sreeramoju ........... H04L 47/365
                                                                                                      370/252

OTHER PUBLICATIONS

De Cicco, L., et al., "Towards cost-effective on-demand continuous media service: a peer-to-peer approach", Retrieved on Jan. 28, 2015 from http://docs.lib.purdue.edu/cgi/viewcontent.cgi?article=2571&context=cstech.pdf, 2003, 19 Pages, Department of Computer Science Purdue University.

* cited by examiner

DYNAMIC/SHARED PMTU CACHE

FIELD

This disclosure relates in general to content delivery over the Internet and, but not by way of limitation, to content delivery networks amongst other things.

BACKGROUND

Content delivery networks (CDNs) have a geographically distributed network of points of presence (POPs) such that one is likely to be close to an end-user. A request for content is matched to a nearby POP using routing, domain name service (DNS) diversion, redirection, Anycast and/or other techniques. An edge server in the POP generally serves the content from a cache of the edge server, a host within the CDN, or an origin server depending on where the content is located. Packets of content objects lost while serving the content can incur delays and reduce the Quality of Service (QoS).

SUMMARY

In various aspects provided herein are systems and methods for delivering content objects over the Internet from a content delivery network to end-user systems. In a related aspect, computer-program products are provided, such as a product tangibly embodied on a non-transitory machine-readable medium with instructions configured to cause a computing device to perform any of the methods described herein. The systems, methods and products described herein optionally utilize one or more techniques for reducing repeated delays associated with lost or dropped data packets due to the data packets having a size larger than a maximum transmission size for portions of the network path between a server and an end-user system.

In order to provide a high QoS for serving content objects to end-user systems, it is desirable to minimize the time necessary for delivery of a content object to an end-user system requesting the content object. If the packets of data including portions of the content object are of a size too large for transmission along the network path between the server and the end-user system, the packets may be dropped, resulting in a delay while waiting for an acknowledgment response for the packets from the end-user system before the transmitting system determines that the packets have been lost. In some situations, an Internet Control Message Protocol (ICMP) Fragmentation Needed message may be generated by the router or system which is incapable of transmitting the packets. In any case, packets that are too large will have to be reduced in size, such as by a fragmentation scheme, and retransmitted.

For repeated sending of unacceptably large packets across such a network path, multiple delays will be incurred. This situation can occur if multiple content objects are served to the receiving end-user system from multiple servers, where each server will, on its own, need to determine what the maximum usable packet size is and will thus have to incur a delay and retransmission of packets of a size too large.

To minimize the delays from repeated attempts at transmitting packets that are too large across a network path incapable of transmitting the large packets, a packet size digest is optionally established that provides an easy mechanism for look-up of known or discovered maximum packet sizes for network paths to various receiving systems. In addition to providing a list of maximum packet sizes, the packet size digest optionally includes further information about a date and time that the maximum packet size for the network path to the receiving system was determined, identification of which server discovered this information and/or identification of which POP this information was discovered from. In various embodiments, multiple addresses can be combined in the packet size digest to indicate a block of addresses which have a common maximum packet size, such as may occur for receiving systems on a common network subnet in which one or more routers providing connectivity with the subnet have a small maximum packet size.

The packet size digest is optionally shared among all servers within a single POP of a content delivery network, such that the discovered information can be advantageously re-used to reduce delays associated with lost packets and determining a path maximum packet size or maximum transmission unit for all servers within the POP. In some embodiments, the packet size digest is shared among multiple POPs of a content delivery network. This may be useful for embodiments where network paths between various POPs to various receiving systems overlap at least in part at routers or other systems having non-standard or an otherwise low maximum transmission unit (MTU).

A network implementation commonly encountered on the global Internet is Ethernet, which has a MTU of 1500 bytes. Other implementations, such as the 802.11 suite of wireless networks and token ring networks, have larger MTUs, and jumbo Ethernet frames of up to 9000 bytes can be encountered. Given its ubiquitous usage, Ethernet generally sets 1500 bytes as a default MTU on the Internet. Tunneled network links may effectively reduce this MTU, however, as the encapsulation of packets in a tunneling protocol will add extra header bytes that would otherwise be available for payload data.

In one aspect, provided are systems for delivering content objects from a content delivery network to receiving systems over an Internet. In a specific embodiment, a system of this aspect comprises a first server, a second server and a cache. In embodiments, the first server is one of a first plurality of servers in a first point of presence of a content delivery network, the content delivery network includes a plurality of points of presence distributed geographically and the content delivery network delivers content over the Internet to receiving systems. In embodiments, the second server is one of a second plurality of servers in a second point of presence of the content delivery network. Optionally, the first and second points of presence belong to federated content delivery networks. In embodiments, the cache stores a digest including maximum packet sizes for network paths to receiving systems, such as MTUs for network paths to various receiving systems. In various embodiments the first server is configured to receive a first request to deliver a first content object to a first receiving system, query the digest, receive a first result identifying a first packet size for a first network path to the first receiving system, transmit the first content object over the Internet to the first receiving system using the first packet size for the first network path to the first receiving system, determine that the first packet size for the first network path to the first receiving system is larger than a first network path maximum packet size and update an entry in the packet size digest for the first network path to the first receiving system with the first network path maximum packet size. In some embodiments, the second server is configured to receive a second request to deliver a second content object to a second receiving system, query the digest, receive a second result identifying a second packet size for a second network path to the second receiving system and transmit the second content object over the Internet to the second receiving system using the second packet size for the second network path to the second receiving system.

In another aspect, provided are methods for delivering content objects from a content delivery network to receiving systems over the Internet. In a specific embodiment, a method of this aspect comprises receiving a first request to deliver a first content object to a first receiving system; querying a digest including maximum packet sizes for network paths to receiving systems; receiving a first result that identifies a first packet size for a first network path to the first receiving system; transmitting the first content object over the Internet to the first receiving system using the first packet size for the first network path to the first receiving system; determining that the first packet size for the first network path to the first receiving system is larger than a first network path maximum packet size; updating an entry in the digest for the first network path to the first receiving system with the first network path maximum packet size. In embodiments, the first request is received at a first server, the first server is one of a first plurality of servers in a first point of presence of a content delivery network, the content delivery network includes a plurality of points of presence distributed geographically, and the content delivery network delivers content over the Internet to receiving systems. Optionally, methods of this aspect further comprise receiving a second request to deliver a second content object to a second receiving system; querying the digest; receiving a second result that identifies a second packet size for a second network path to the second receiving system; and transmitting the second content object over the Internet to the second receiving system using the second packet size for the second network path to the second receiving system. In embodiments, the second request is received at a second server and the second server is one of a second plurality of servers in a second point of presence of the content delivery network. Optionally the first and second servers belong to federated content delivery networks.

In embodiments, a cache is exemplified as a computer storage memory, such as a transitory or non-transitory memory, with the digest stored in the memory. In some embodiments, the digest is configured to receive queries from multiple servers for maximum packet sizes for network paths to receiving systems, provide results to multiple servers for maximum packet sizes for network paths to receiving systems and/or receive updates from multiple servers for changes to maximum packet sizes for network paths to receiving systems. In some embodiments, the digest tracks network performance metrics for connections between a server and receiving systems. Optionally, the digest receives queries from multiple servers for maximum packet sizes for network paths to receiving systems. Optionally, the digest provides results to multiple servers for maximum packet sizes for network paths to receiving systems. Optionally, the digest receives updates from multiple servers for changes to maximum packet size entries for network paths to receiving systems. Optionally, the digest perpetually tracks maximum packet sizes for network paths to receiving systems.

Optionally, the second receiving system and the first receiving system are the same receiving system and, for example, in one embodiment, the second packet size is the first network path maximum packet size. Optionally, the second receiving system and the first receiving system are part of a common subnet such that the first network path and the second network path at least partially overlap at a network node that is only capable of transmitting packets having a size less than or equal to first network path maximum packet size and the digest includes an entry indicating the first network path maximum size for a block of receiving systems that are part of the common subnet. Other configurations are possible, such as where a plurality of receiving systems with common network path maximum sizes are grouped in a block in the digest. For example, in some embodiments, a range of IP addresses are used to indicate a block of receiving systems, such as a range expressed in dotted notation like 192.168.88.15-192.168.88.34.

Various CDN configurations are contemplated, such as where individual digests track MTUs for network paths between receiving systems and single POPs or where a common digest is used to track MTUs for network paths between receiving systems and multiple POPs. Optionally, the first point of presence and the second point of presence are the same point of presence and the digest includes maximum packet sizes for network paths from the point of presence to receiving systems. Optionally, the first point of presence and the second point of presence are difference points of presence and the digest includes maximum packet sizes for network paths from one or both of the first point of presence or the second point of presence to receiving systems.

Various techniques can be used to determine that packets are too large to traverse a network path to a receiving system. Optionally, a message can be received that indicates a packet is too large or requires fragmentation. Optionally, a server can determine that no packets larger than a specific size are being received, such as by determining that no acknowledgment signals are received in response to transmission of packets larger than the specific size. In various embodiments, the first server is configured to receive a message indicating the first packet size is larger than the first network path maximum packet size or that the first packet size requires fragmentation in order to determine that the first packet size for the first network path to the first receiving system is larger than the first network path maximum packet size. In some embodiments, the first server is configured to receive no acknowledgement for transmission of a packet larger than the first network path maximum packet size in order to determine that the first packet size for the first network path to the first receiving system is larger than the first network path maximum packet size.

In embodiments, one server maintains the digest and receives updates from other servers in one or more points of presence. In other embodiments, multiple servers within a point of presence maintain their own, or local, copies of the digest. Updates to the local copies can optionally be retrieved from a master server that maintains an authoritative copy of the digest or can optionally be exchanged between servers, such as by using a gossip protocol. In exemplary embodiments, the first server is configured to share packet size updates to the digest with one or more of the first plurality of servers in the first point of presence of the content delivery network and/or one or more of the second plurality of servers in the second point of presence of the content delivery network.

Optionally, various techniques and configurations may be used in attempt to discover whether a maximum packet size for a network path to a receiving system has increased. In some embodiments, a system comprises a third server, such as a third server that is one of the first plurality of servers in the first point of presence of the content delivery network. Optionally, the third server is configured to receive a third request to deliver a third content object to a third receiving system, query the digest, receive a third result identifying a third packet size for a third network path to the third receiving system, transmit the third content object over the Internet to the third receiving system using a fourth packet size larger than the third packet size for the third network path to the third receiving system, receive an acknowledgment for successful transmission of packets of the third content object over the third network path to the third receiving system using the fourth packet size and update an entry in the packet size digest for the third network path to the third receiving system with the fourth packet size. In some embodiments, a method further comprises receiving a request to deliver a third content object to a third receiving system, wherein the request is received at a third server, the third server is one of the first plurality of servers in the first point of presence of the content delivery network, querying the digest; receiving a third result that identifies a third packet size for a third network path to the third receiving system; transmitting the third content object over the Internet to the third receiving system using a fourth packet size larger than the third packet size for the third network path to the third receiving system; receiving an acknowledgment for successful transmission of packets of the third content object over the third network path to the third receiving system using the fourth packet size; and updating an entry in the digest for the third network path to the third receiving system with the fourth packet size.

In another aspect, provided are computer-program products, such as computer program products tangibly embodied in a non-transitory machine-readable storage medium comprising instructions that, when executed by one or more processors in a computing device cause a computing device to perform a method of the invention. In one embodiment, a computer-program product comprises instructions that, when executed by one or more processors in a computing device, cause the computing device to receive a first request to deliver a first content object over an Internet to a first receiving system; query a digest that perpetually tracks maximum packet sizes for network paths to receiving systems; receive a first result that identifies a first packet size for a first network path to the first receiving system; transmit the first content object over the Internet to the first receiving system using the first packet size for the first network path to the first receiving system; determine that the first packet size for the first network path to the first receiving system is larger than a first network path maximum packet size; and update an entry in the digest for the first network path to the first receiving system with the first network path maximum packet size.

Optionally, the instructions further comprise instructions configured to cause the computing device to receive a second request to deliver a second content object over the Internet to a second receiving system; query the digest; receive a second result that identifies a second packet size for a second network path to the second receiving system; and transmit the second content object over the Internet to the second receiving system using the second packet size for the second network path to the second receiving system. In some embodiments, for example, the instructions configured to cause the computing device to update an entry in the digest for the first network path to the first receiving system with the first network path maximum packet size further include causing the computing device to transmit the updated entry in the digest to one or more other computing devices.

In various embodiments, aspects of the present invention are embodied as an application that is executed by a processor on a server, network device or other computing device, such as a computer-program product tangibly embodied on a non-transitory machine-readable storage medium comprising instructions for execution by one or more processors in a computing device. For example, in embodiments, the above-described methods are implemented in the application layer of a network stack, such as described in the OSI Model. In some embodiments, the described methods utilize application information, also referred to herein as application-level information, to determine a route or transport characteristics to be used with content objects. Similarly, in some embodiments, the above-described methods are implemented as a layer existing on top of the application layer, such as an application or software subroutine that interacts using an application-layer protocol that provides an interface with a transport or network protocol or a communication subsystem. In a specific embodiment, a method implemented in the application layer modifies one or more transport layer or network layer parameters, such as to change the transport path that various network connections traverse. For example, embodiments include requiring that a request for a content object be served over a specific network connection, or through a specific route or that serving a content object use specific transport layer, network layer or link layer characteristics.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures in which.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
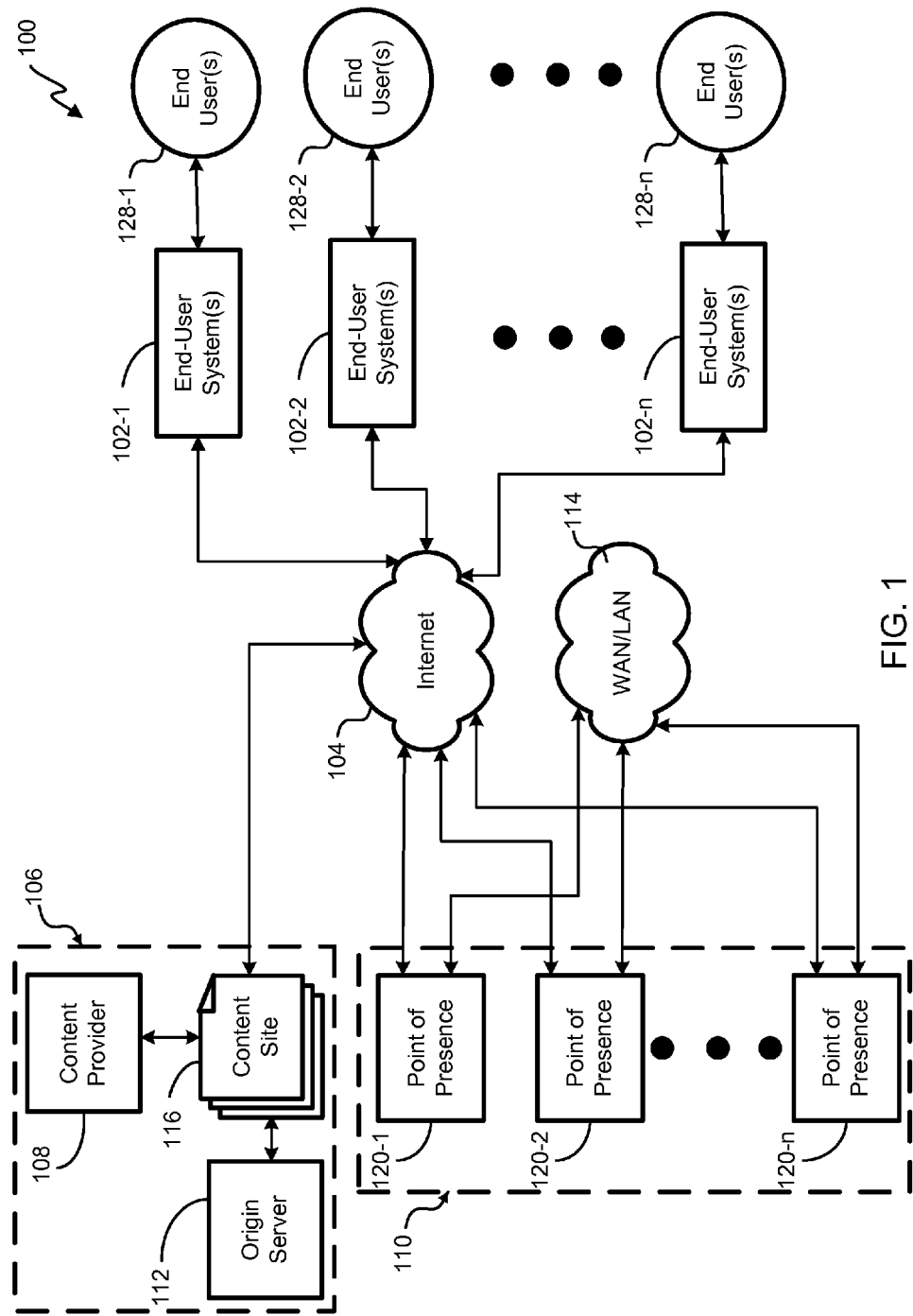
FIG. 1 depicts a block diagram of an embodiment of a content distribution system.

Referring first to FIG. 1, a block diagram of an embodiment of a content distribution system 100 is shown. The content originator 106 offloads delivery of the content objects to a content delivery network (CDN) 110. The content originator 106 produces and/or distributes content objects and includes a content provider 108, a content site 116, and an origin server 112. The CDN 110 can both cache and/or host content in various embodiments for third parties to offload delivery and typically provide better quality of service (QoS) to a broad spectrum of end-user systems 102 distributed geographically. The content originator 106 is the customer of the CDN 110 and an end user 128 benefits from improvements in QoS.

In this embodiment, the content distribution system 100 locates the content objects (or portions thereof) and distributes the content objects to an end-user system 102. The content objects are dynamically cached within the CDN 110 and/or hosted by the CDN 110. A content object is any content file, content stream, or a range defining a segment of a content file or content stream, and could include, for example, video, pictures, data, audio, software, and/or text. The content object could be live, delayed, or stored. The range defining a segment could be defined as a byte range or time range within the playback. Throughout the specification, references may be made to a content object, content, content stream and/or content file, but it is to be understood that those terms could be used interchangeably wherever they may appear.

Many content providers 108 use a CDN 110 (or multiple CDNs) to deliver the content objects over the Internet 104 to end users 128. The CDN 110 includes a number of points of presence (POPs) 120, which are geographically distributed through the content distribution system 100 to deliver content. Various embodiments may have any number of POPs 120 within the CDN 110 that are generally distributed in various locations around the Internet 104 so as to be proximate to end-user systems 102. Multiple POPs 120 use the same IP address such that an Anycast routing scheme is used to find a POP likely to be close to the end-user system 102, in a network sense, for each request. In addition to the Internet 104, a wide area network (WAN) and/or local area network (LAN) 114 or other backbone may couple the POPs 120 with each other and also couple the POPs 120 with other parts of the CDN 110. Distributed storage, processing, and caching is provided by the CDN 110.

When an end user 128 requests a web page (or other content) through its respective end-user system 102, the request for the web page is passed either directly or indirectly via the Internet 104 to the content originator 106. The content originator 106 is the source or re-distributor of content objects, i.e., the so-called origin server 112. The content site 116 is an Internet web site accessible by the end-user system 102. In one embodiment, the content site 116 could be a web site where the content is viewable with a web browser. In other embodiments, the content site 116 could be accessible with application software other than a web browser. The content provider 108 directs content requests to a CDN 110 after they are made or formulates the delivery path by embedding the delivery path into a uniform resource identifier (URI) for a web page. In any event, the request for content is handed over to the CDN 110 in this embodiment by using an Anycast IP address corresponding to two or more POPs 120. In some embodiments, the CDN 110 hosts content objects and/or web pages, thus acting as the origin server 112.

Once the request for a content object is passed to the CDN 110, the request is associated with a particular POP 120 within the CDN 110 using the Anycast routing scheme, but other embodiments could use routing, redirection, or DNS to shunt requests to a particular POP 120. It is noted that the CDN 110 processes requests for content in the application layer of the open systems interconnection (OSI) model with URIs, URLs, and HTTP. The particular POP 120 may retrieve the portion of the content object from the content provider 108, where the content originator 106 is hosting the origin server 112. Alternatively, the content provider 108 may directly provide the content object to the CDN 110 and POPs 120 associated with the CDN 110 through pre-population of caches (i.e., in advance of the first request) or hosting. A storage policy could be defined to specify the conditions under which pre-population is performed. In this embodiment, content objects are provided to the CDN 110 and stored in one or more CDN servers such that the portion of the requested content may be hosted from the CDN 110. The CDN servers include edge servers in each POP 120 that serve end-user requests. The origin server 112 holds a copy of each content object for the content originator 106. Periodically, the content of the origin server 112 may be reconciled with the CDN 110 through a caching, hosting, and/or pre-population algorithm, for example, through a storage policy. Some content providers 108 could use an origin server 112 within the CDN 110 to host the content and avoid the need to maintain a copy.

Once the content object is retrieved, the content object is stored within the particular POP 120 and is served from that POP to the end-user system 102. The end-user system 102 receives the content object and processes the content object for use by the end user 128. The end-user system 102 could be a personal computer, media player, handheld computer, tablet, pad, Internet appliance, phone, smart phone, IPTV set top, streaming radio, or any other device that receives and plays content objects. In some embodiments, a number of the end-user systems 102 could be networked together. Although this embodiment shows only a single content originator 106 and a single CDN 110, it is to be understood that there could be many of each in various embodiments.

Further, in some cases, the content object is stored within multiple POPs 120 or parts of a content object are distributed across POPs 120, such as where one part of a content object is stored within one POP 120-1 while other parts of the content object are stored within another POP 120-2. Optionally, a first portion of the content object is served from one POP 120-1 to the end-system 102 and a second portion of the content object is served from another POP 120-2 to the end-user system 102. Optionally, the content delivery network 110 includes a policy engine for determining which POP(s) 120 the content object, or portions thereof, is stored. In some embodiments, a policy engine uses information from one or more digests to determine which POP 120 is used to store a content object and/or serve a content object to an end-user system 102. For example, in one embodiment, the policy engine may determine which POP 120 can provide the best QoS for delivery of a content object, or a portion thereof, to an end-user system using information from the one or more digests. In exemplary embodiments, digests that track latency, throughput, jitter, bandwidth, error rates or other network performance metrics between POPs 120 and end-user systems 102 can allow a policy engine to determine which POP to use to store and/or serve content objects.

Figure 2:
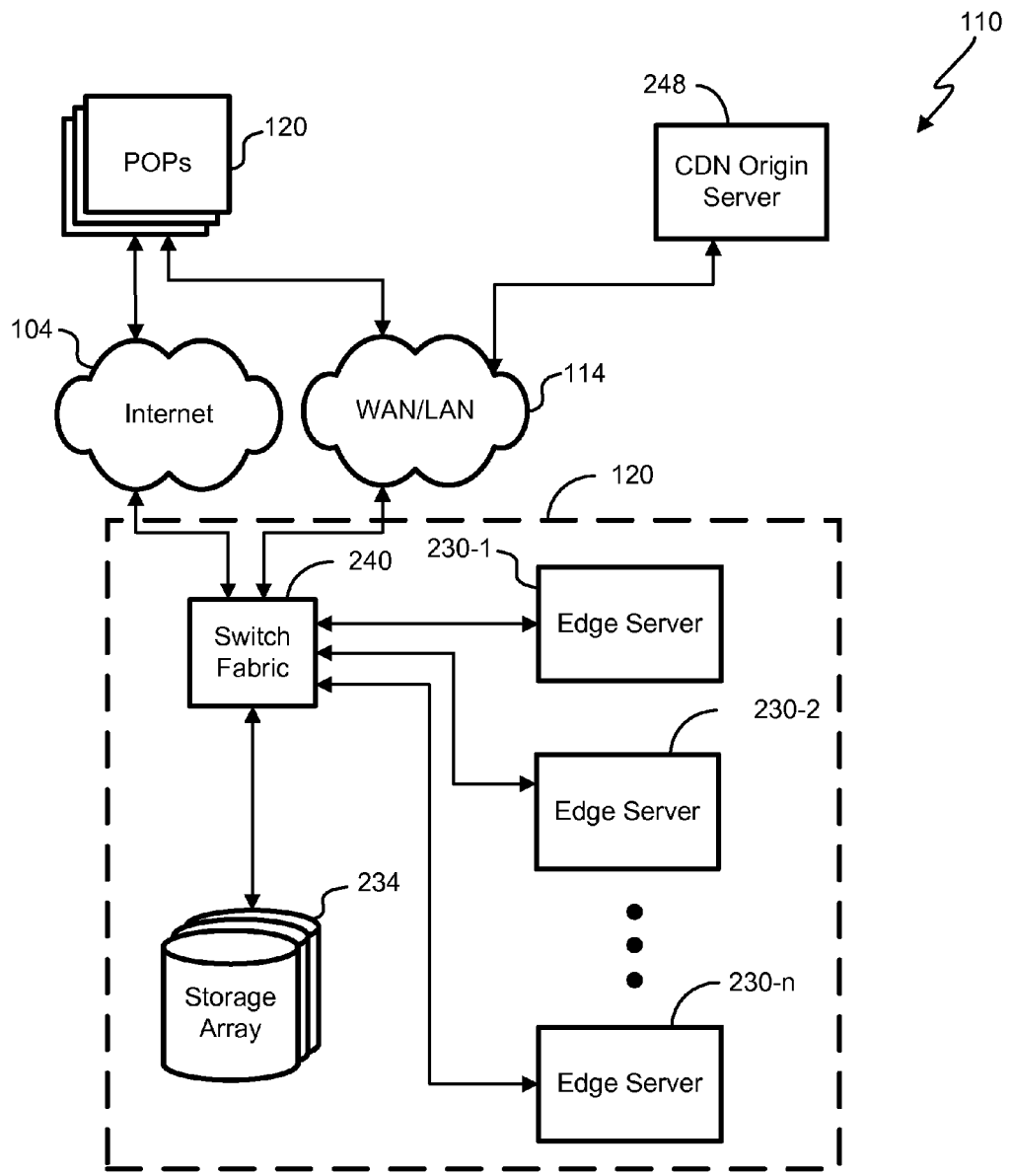
FIG. 2 depicts a block diagram of an embodiment of a content delivery network (CDN)

With reference to FIG. 2, a block diagram of an embodiment of a CDN 110 is shown. Although only one POP 120 is shown in detail, there are a number of POPs 120 similarly configured throughout the CDN 110. The POPs 120 communicate through a WAN/LAN 114 and/or the Internet 104 when locating content objects. An interface from the Internet 104 to the POP 120 accepts requests for content objects from end-user systems 102. The requests come from an Internet protocol (IP) address of the end-user system 102 in the form of a URI that causes an HTTP get command. The requests for content files from the CDN 110 pass through the application layer.

Switch fabric 240 assigns the request to one of the edge servers 230 according to a routing scheme such as round robin, load balancing, etc. In some embodiments, the switch fabric 240 is aware of which edge servers 230 have what capabilities and assigns requests within the group having the capability to store and serve the particular content object referenced in the URI. Edge servers 230 gathered in a particular group as neighbors can be grouped with other servers in the current POP 120, less loaded servers in the current POP 120, servers having a capability to process the content object, a subset of servers assigned to a customer using the CDN 110 to serve the content object, or some other grouping of servers in the POP 120.

In some cases, the CDN 110 is used to host content for others. Content providers 108 upload content to a CDN origin server 248. Although only one CDN origin server 248 is shown, it is to be understood that there could be many spread among a number of locations and/or POPs 120. The content object can be stored in the CDN origin server 248. The CDN origin server 248 serves the content object within the CDN 110 to various edge servers 230 in various POPs 120. After the content provider 108 places a content object on the CDN origin server 248 the content object need not be hosted on an origin server 112 of the content originator 106 redundantly. Although shown separately, it is to be understood that the CDN origin sever 248 could be integral to an edge server 230.

Some embodiments include an optional storage array 234 in the POP 120 or elsewhere in the CDN 110. The storage array 234 can provide hosting, storage, and/or caching. Edge servers 230 can revert to the storage array 234 for certain content, for example, very large files or infrequently requested files. Flushing of a cache of an edge server 230 could move the content to the storage array 234 until it is ultimately flushed from the storage array 234 after which subsequent requests would be fulfilled by an origin server 112 to repopulate cache in the POP 120.

Requests from end-user systems 102 are assigned to an edge server 230 that may cache, store, or host the requested content object. At times, the edge server 230 receiving a request does not have the content object stored for immediate serving. This so-called "cache miss" triggers a process within the CDN 110 to find the content object (or portion thereof). The content may be found in neighboring edge servers 230 in the same POP 120, in another POP 120, in a CDN origin server 248, in a POP storage array 234, or even an origin server 112 external to the CDN 110. The various edge servers 230 and CDN origin servers 248 are grouped for various URIs uniquely. In other words, one URI may look to one group of servers 230, 248 on a cache miss while another URI will look to a different group of servers 230, 248.

Figure 3:
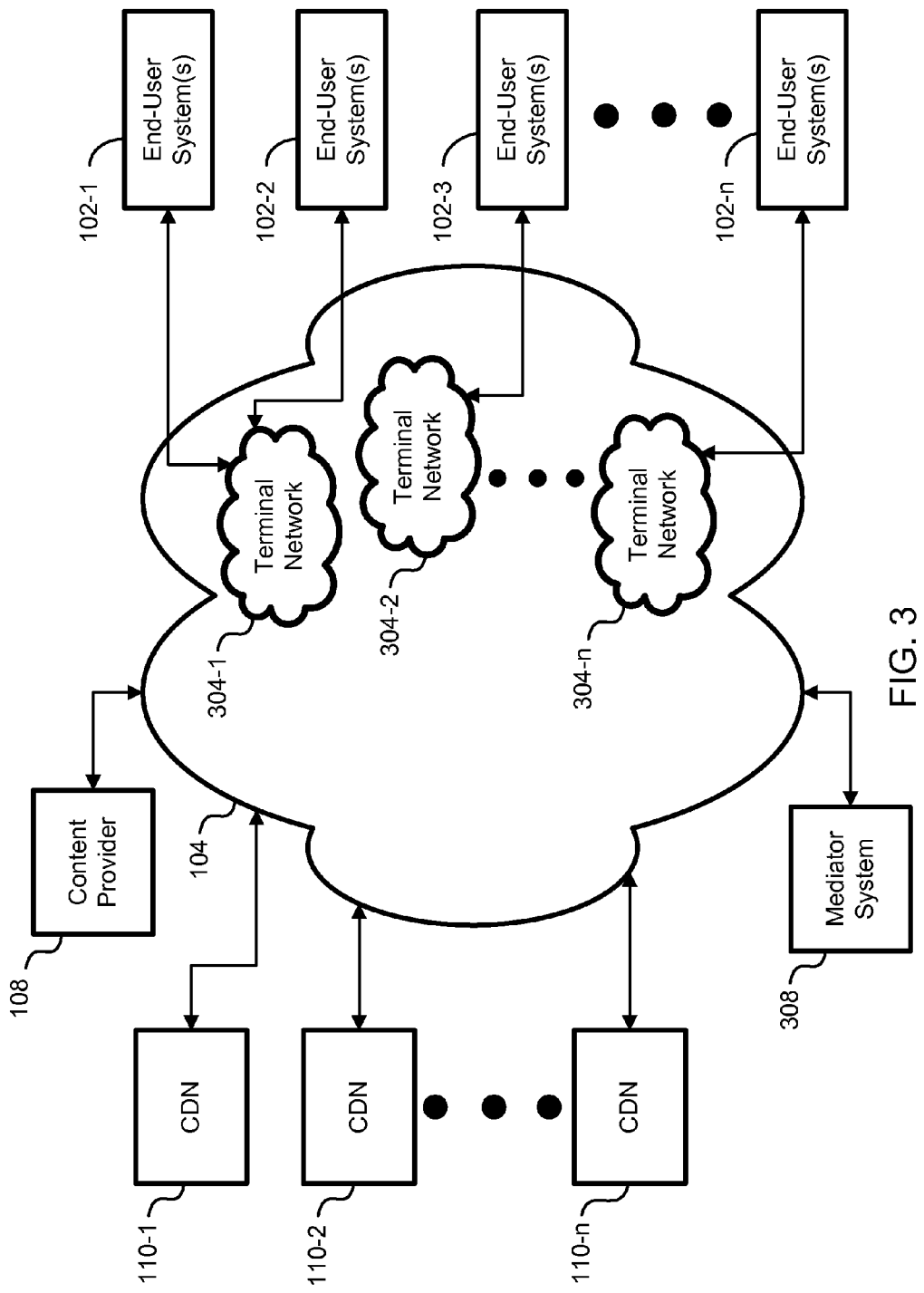
FIG. 3 depicts a block diagram of an embodiment of a cooperative delivery system.

Referring next to FIG. 3, an embodiment of a cooperative delivery system is shown. A content provider 108 is connected to the Internet 104. Also connected to the Internet 104 are a plurality of CDNs 110 and a plurality of end-user systems 102. As part of the Internet 104, a plurality of terminal networks 304 provide Internet service to the plurality of end-user systems 102. In some embodiments, terminal networks 304 are "last mile" networks providing telecommunications, cable television, and/or Internet services to end users 128. Some examples of terminal networks 304 include CenturyLink, Comcast, Verizon, and AT&T. In some embodiments, terminal networks 304 include peer networks. In some embodiments, terminal networks 304 have caches to store content objects. Caches of the terminal networks 304 can be a single cache, or spread out among a plurality of caches similar to a CDN 110 with a plurality of POPs 120. Some terminal networks 304 function as a content delivery network 110.

In this embodiment, the content provider 108 contracts with a first CDN 110-1 for delivery of a content object to end-user systems 102. Though only one content provider 108 is shown, there may be many content providers 108 contracting with CDNs 110 and/or terminal networks 304 for delivery of a plurality of content objects. Also, an origin server 112 having the content object can be external to the CDN 110 or internal to the CDN 110, such as in a CDN origin server 248. In some embodiments, the first CDN 110-1 subcontracts delivery of the content object to a second CDN 110-2 and/or terminal network 304 for delivery to an end-user system 102. The first CDN 110-1 may subcontract delivery of the content object for various reasons. For example, the second CDN 110-2 may have a better coverage of POPs 120 in a given geographic area. The first CDN 110-1 may have several POPs 120 in North America and Europe, but not South America. The second CDN 110-2 may have several POPs 120 in South America. To deliver the content object to an end user 128 in South America, the first CDN 110-1 subcontracts delivery of the content object to the second CDN 110-2. In another example, the second CDN 110-2 also has POPs 120 in Europe. When POPs 120 of the first CDN 110-1 in Europe become overloaded, the first CDN 110-1 has the second CDN 110-2 deliver the content object in Europe.

In some embodiments, the first CDN 110-1 subcontracts delivery of the content object with terminal networks 304. For example, the first terminal network 304-1 caches the content object when delivering the content object to a first end-user system 102-1. When a second end-user system 102-2 requests the content object, the first terminal network 304-1 serves the content object from a cache of the first terminal network 304-1.

In some embodiments, a mediator system 308 is also connected to the Internet 104. The mediator system 308 serves several functions for the cooperative delivery system, such as assignment, accounting, and control. In some embodiments, the mediator system 308 receives requests for delivery of the content object and assigns a CDN 110 or a terminal network 304 to deliver the content object. The mediator system 308 chooses a CDN 110 or terminal network 304 based on geography, latency in a network, delivery cost, quality of service, etc. In some embodiments, the mediator system 308 contracts with the content provider 108 for delivery of the content object instead of the first CDN 110-1 contracting with the content provider 108 for delivery of the content object. In some embodiments, the mediator system 308 is part of, and/or controlled by, a CDN 110 or terminal network 304. Also, a cooperative delivery system may comprise two or more mediator systems 308, and each mediator system 308 is tied to a particular CDN 110.

In some embodiments, the mediator system 308 accounts for content delivery. After assigning delivery of the content object to a CDN 110 or terminal network 304, the mediator system 308 credits that network with delivery of the content object. In other embodiments, the mediator system 308 receives reports about delivery of the content object before crediting the CDN 110 or terminal network 304 for delivery.

In some embodiments, the mediator system 308 also establishes control parameters for delivery of the content object. For example, the content provider 108 sets a minimum quality of service threshold for delivering the content object. When assigning delivery of the content object, the mediator system 308 passes variables specifying the control parameters to the CDN 110 and/or terminal network 304 delivering the content object.

As described above, it is desirable to minimize the time necessary for delivery of a content object to an end-user system requesting the content object. Various processes can be implemented to reduce delays in delivery of content objects. For example, in some embodiments, network packets containing all or portions of various content objects may occasionally be lost or dropped, necessitating retransmission of the missing packets and minimizing or eliminating the losing or dropping of packets can reduce the time necessary for content object delivery or otherwise improve QoS for the end-user. Countdown timers are generally used to determine whether a network packet does not reach its destination, with the packet being retransmitted upon the countdown timer elapsing before an acknowledgement signal indicating successful delivery is received.

In some embodiments, network packets can be dropped or require fragmentation if their size exceeds a maximum size supported by a transmitting system, such as a router. Various considerations determine the maximum transmission size or maximum transmission unit (MTU) supported by a system. For example, various networking link layer specifications establish different MTUs. For example, Ethernet V2 frames support a maximum transmission size of 1500 bytes, while 802.11 wireless networking technologies support a maximum transmission size of 2304 bytes.

Given the ubiquitous usage of Ethernet, however, a typical MTU of an overall network path on the Internet between a server and a receiving system of 1500 bytes is common, though not guaranteed. For example, portions of some network paths may tunnel packets within a different network protocol, resulting in an overall larger packet being transmitted over the tunneled portion of the path. For example, the size of the packets transmitted over the tunneled portion of the network will be increased by the extra header information of the encapsulating protocol. In one embodiment, an IPv6 packet is tunneled over an IPv4 link by encapsulating the IPv6 packet within an IPv4 packet, resulting in the packet being increased in size over the tunneled link by at least 20 bytes for the IPv4 header information. For example, if the IPv6 packet is 1500 bytes, encapsulating the packet in an IPv4 packet will increase the packet size by at least 20 bytes to 1520 bytes or more. If the tunneled portion of the path has a maximum transmission unit of 1500 bytes, the encapsulated packet will require fragmentation and may be rejected or dropped. From the server's point of view, the effective MTU for the path to the receiving system would thus be 1480 bytes or less, depending upon the size of the IPv4 header information. If extra encapsulation protocols are used, such as Generic Routing Encapsulation (GRE) or Internet Protocol Security (IPSec), which are commonly used in virtual private network tunnels and by mobile Internet providers, the packet size will be further increased by the extra header information. Similarly, encapsulating an IPv4 packet within an IPv6 packet will reduce the effective MTU for the path by the size of the added IPv6 header.

Figure 4A:
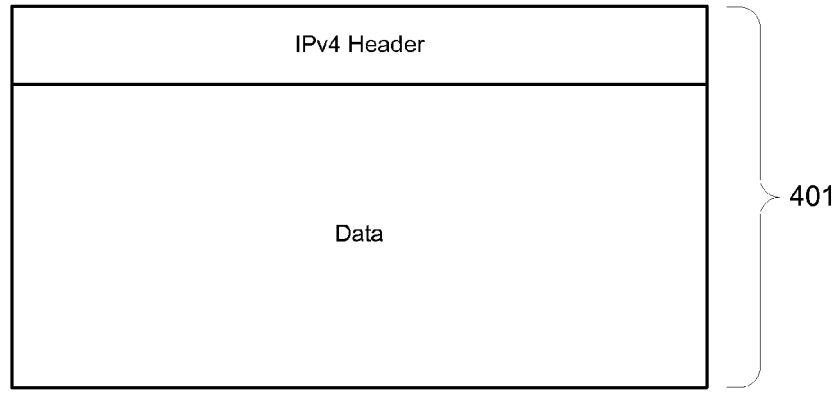
FIG. 4A, FIG. 4B and FIG. 4C illustrate schematic diagrams of network packets.
Figure 4B:
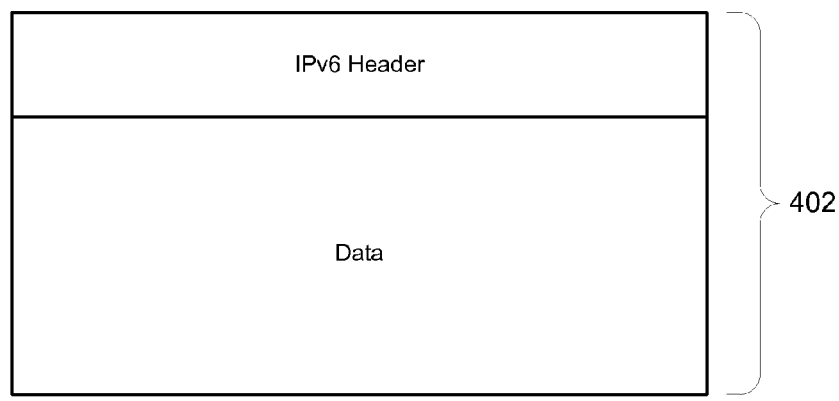
Figure 4C:
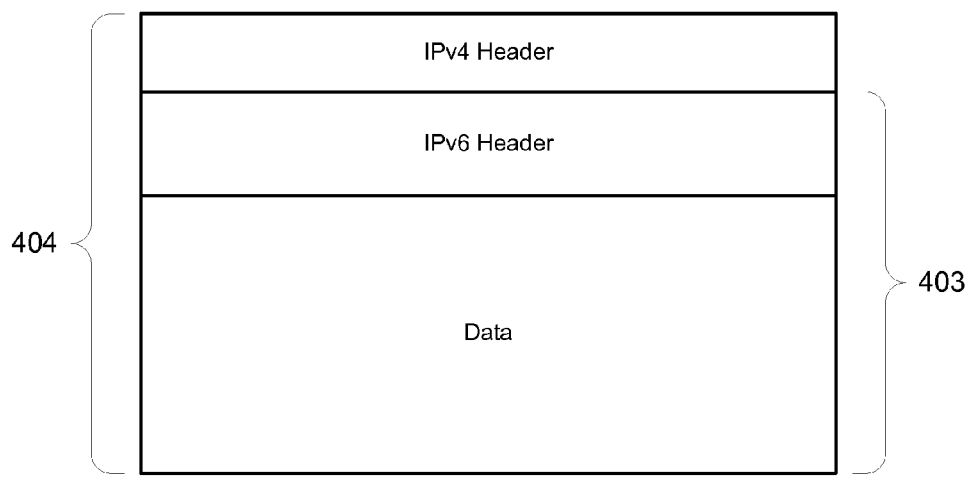

FIG. 4A, FIG. 4B and FIG. 4C illustrate schematic diagrams of network packets to elaborate on the concept of a network tunnel. FIG. 4A illustrates an IPv4 packet 401 including an IPv4 header and a data payload. FIG. 4B illustrates an IPv6 packet 402 including an IPv6 header and a data payload. As is well known in the art, the default IPv6 header is longer than the default IPv4 header and packets constructed for each of the different IP protocols may not be interoperable.

One technique for sending packets of a first IP protocol over a second IP network (e.g., sending IPv6 packets over an IPv4 network), is to establish an IP tunnel. For example, a packet of the first IP protocol can be encapsulated in a second IP protocol packet, such as by adding extra header information of the second IP protocol. In this way, the packet of the first IP protocol will be the data payload of the second IP protocol packet. FIG. 4C illustrates an IPv6 packet 403 encapsulated within an IPv4 packet 404. As shown, the IPv4 packet 404 is of a larger size than the IPv6 packet 403.

Such an IP tunnel will add extra overhead for transmitting the data over network links. In addition, the size of the extra IP header information will expand the packet size by the size of the additional header information. As described above, encapsulating an IPv6 packet in an IPv4 packet will increase the packet size by at least an additional 20 bytes, corresponding to the minimum size of an IPv4 header.

Some, although not all, network routers will return a signal indicating that a network packet is too large for transmission, such as by returning an Internet Control Message Protocol (ICMP) fragmentation needed message to the originating system. Receiving a fragmentation needed message may be the best case scenario, though, as at most a single round-trip time delay will be incurred before retransmission. In addition, fragmentation needed messages may include the MTU, eliminating any need to further discover the MTU. When no ICMP fragmentation needed message is returned, the originating system will typically allow its countdown timer to elapse before determining that a packet had a size too large to allow successful transmission to its destination and attempting retransmission. Such a countdown timer can be long, for example up to 3 seconds and multiple failures may be required before the size of the packet will be reduced, which can impart significant delays in transmitting data from one network device to another. For example, if 3 or more timeouts and retransmissions are required before reducing the packet size then this may impart over 10 seconds of delay.

Figure 5A:
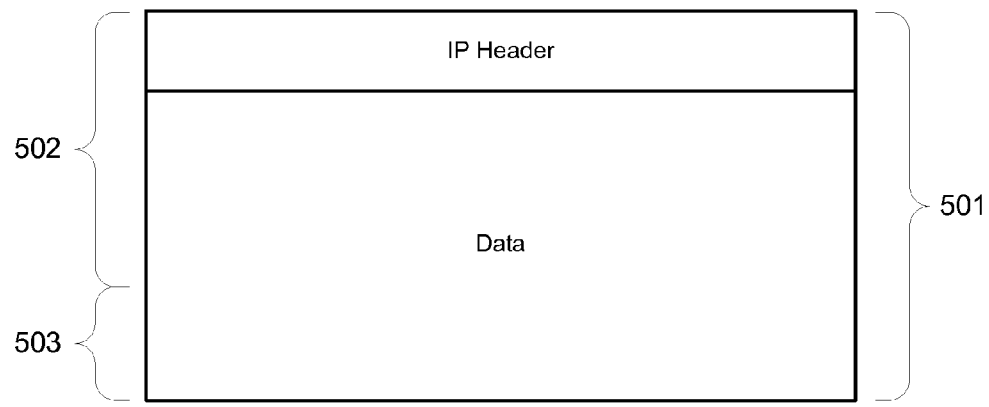
FIG. 5A and FIG. 5B illustrate schematic diagrams of network packets.
Figure 5B:
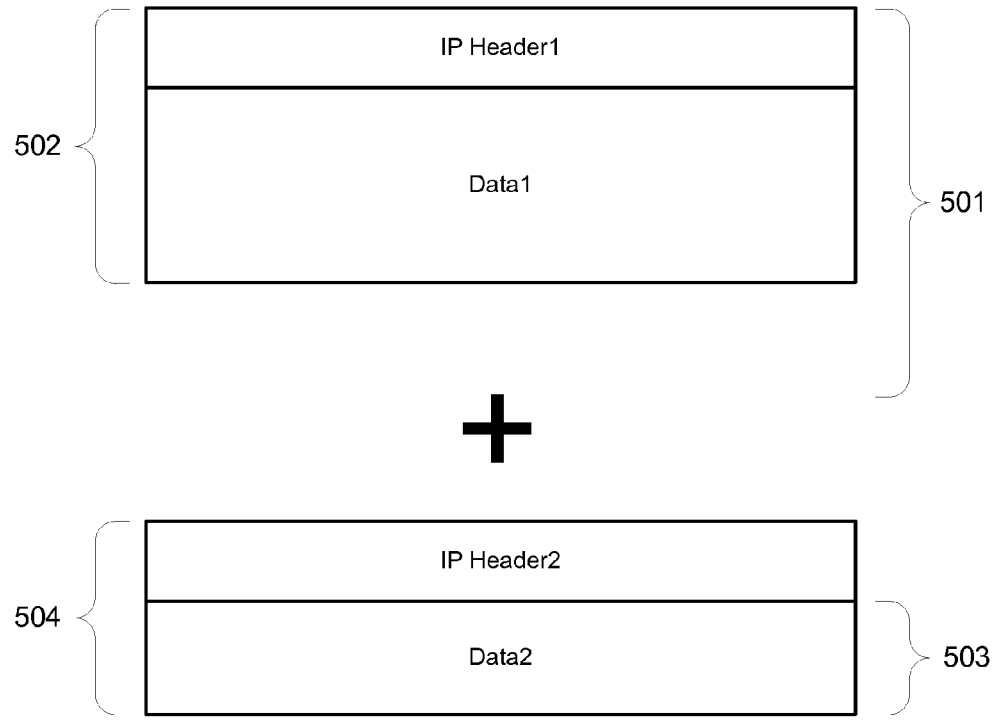

FIGS. 5A and 5B illustrate schematic diagrams of network packets to show the concept of packet fragmentation. In FIG. 5A, an IP packet is shown of size 501. If, for example, the packet needs to traverse a network link having an MTU of size 502, this packet must be fragmented. An example fragmentation can be constructed as the packets illustrated in FIG. 5B. Here, a first packet of size 502 is constructed. A second packet having a size 504 is constructed with a data block that corresponds to the residual size 503 of the packet shown in FIG. 5A and an IP header. Each of the packets shown in FIG. 5B would be able to traverse the network link having an MTU of size 502.

For some embodiments, upon determining that a packet size is too large to transmit across a network path, a server may reduce the packet size, such as to a guaranteed supported size (e.g., 576 bytes), in order to ensure that the packets will reach their destination. Such a situation, however, is sub-optimal, as doing so will increase the overhead for data transmission and reduce overall data throughput and/or efficiency. This can occur because the overhead, for example TCP/IP header information, may remain a constant size while the data payload is reduced to accommodate a smaller MTU. For example, reducing a 1500 byte Ethernet frame including 20 bytes of IP header information, 20 bytes of TCP header information and 1460 bytes of data to a 576 byte frame including 20 bytes of IP header information, 20 bytes of TCP header information and 536 bytes of data will result in a data efficiency reduction from 1460/1500 (~97%) to 536/576 (~93%). The overall efficiency will be slightly smaller if the Ethernet link layer header and footer size is included in the total transmission size. In addition, the packet processing overhead will be approximately tripled for packets of a size of 576 bytes versus packets of 1500 bytes, as about 3 packets will be required to transmit the same amount of data. Further, at high speeds, increased CPU usage and latency resulting from the increase in the number of packets required to transmit the same amount of data can further decrease throughput.

In some embodiments, a server will keep track of the maximum packet size for network paths to various client systems, such as in a routing cache or host cache, if they are smaller than a default packet size. Such a cache, however, may be of a fixed length, or may reset after a fixed time period. For example, for each time that a routing cache or host cache entry for a receiving system's MTU is overridden or lost, a server may return to sending default sized packet, such as a 1500 byte packet, to a receiving system and encounter a lost packet or a fragmentation needed message and an associated delay, including for retransmission of the lost packets. Further, each server in a server farm or content delivery network point of presence may maintain its own routing cache or host cache and will thus encounter a similar delay for sending packets to the same receiving system and each server will have to learn on its own what the maximum packet size for the network path to the receiving system is.

In order to overcome such recurring delays, methods and systems of embodiments of the invention employ a shared MTU cache, such as that allows each server to be aware of the determined non-default MTUs for network paths to various receiving systems. In this way, upon one server determining a non-default MTU for a network path to a particular receiving system, other servers will not have to discover this information for themselves and potentially incur a long delay, such as multiple 3 second timeouts. In embodiments, a shared MTU cache is a perpetual and dynamic list of non-default MTUs and associated network addresses or blocks of addresses. In embodiments, a shared MTU cache is used synonymously herein with a packet size digest.

Figure 6A:
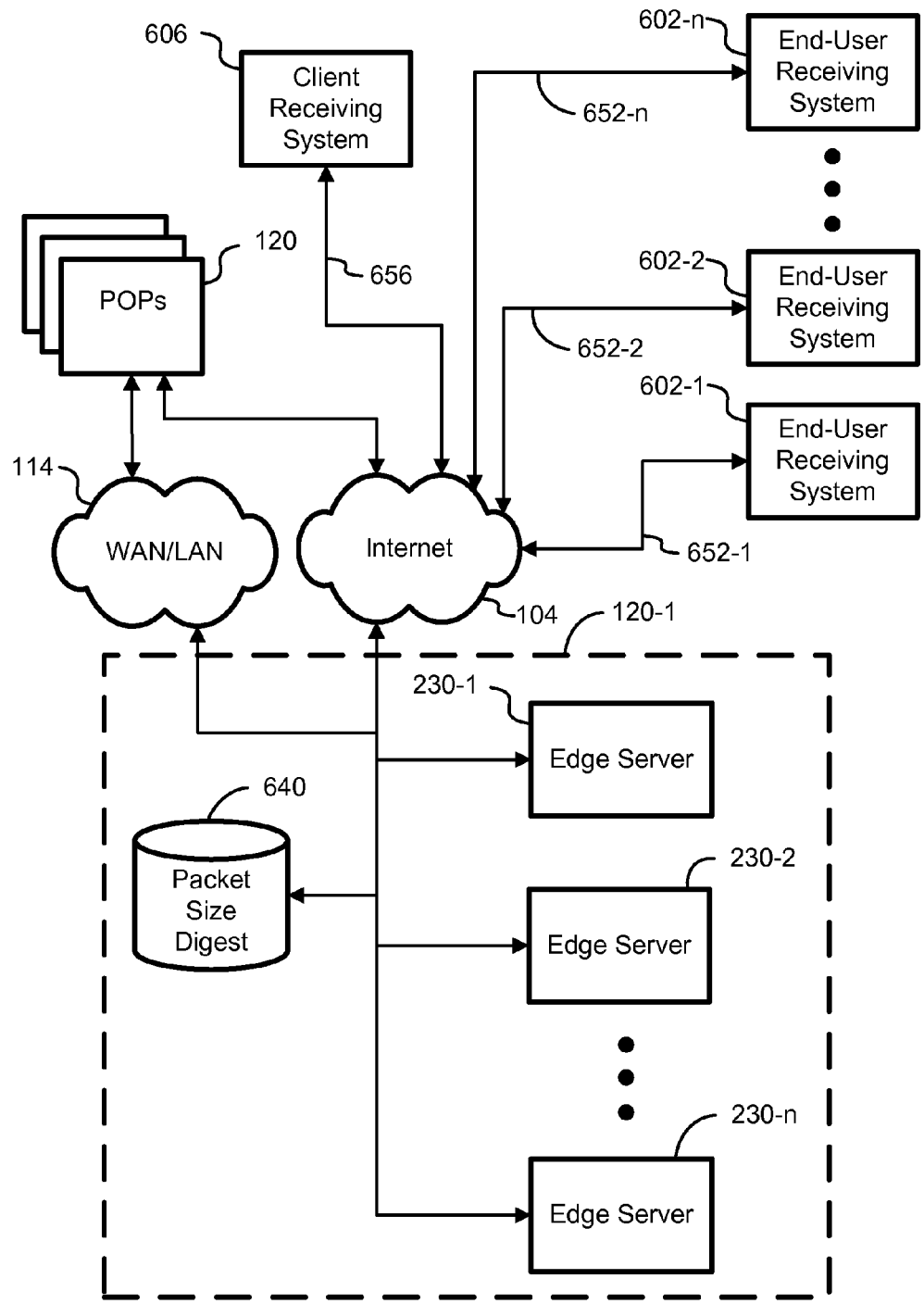
FIG. 6A, FIG. 6B, FIG. 6C and FIG. 6D depict block diagrams of content distribution system embodiments.

FIGS. 6A, 6B, 6C and 6D depict block diagrams of content distribution system embodiments. In these figures various receiving systems, such as client receiving systems 406 and end-user receiving systems 402 connect to Internet 104. Points of presence 120 also connect to the Internet 104, but may also connect to one another through a WAN/LAN 114. An expanded view of POP 120-1 is shown in FIG. 6A. Here, edge servers 230 connect to Internet 104, such as for serving content objects to client receiving system 606 and end-user receiving systems 602, and to WAN/LAN 114, such as for exchanging data with other POPs 120. As shown in FIG. 6A, a packet size digest 640 is included in POP 120-1, which is used to store a list of receiving system network addresses and path MTU to the receiving system. In one embodiment, the packet size digest 640 stores only non-default MTU. Edge servers 230 serving content objects to various end-user receiving systems 602 or client receiving system 606 can query the packet size digest to discover what the path MTU to the receiving system is and construct packets including portions of the content objects of appropriate size for sending along the various network paths 652 and 656 to the receiving systems.

Figure 6B:
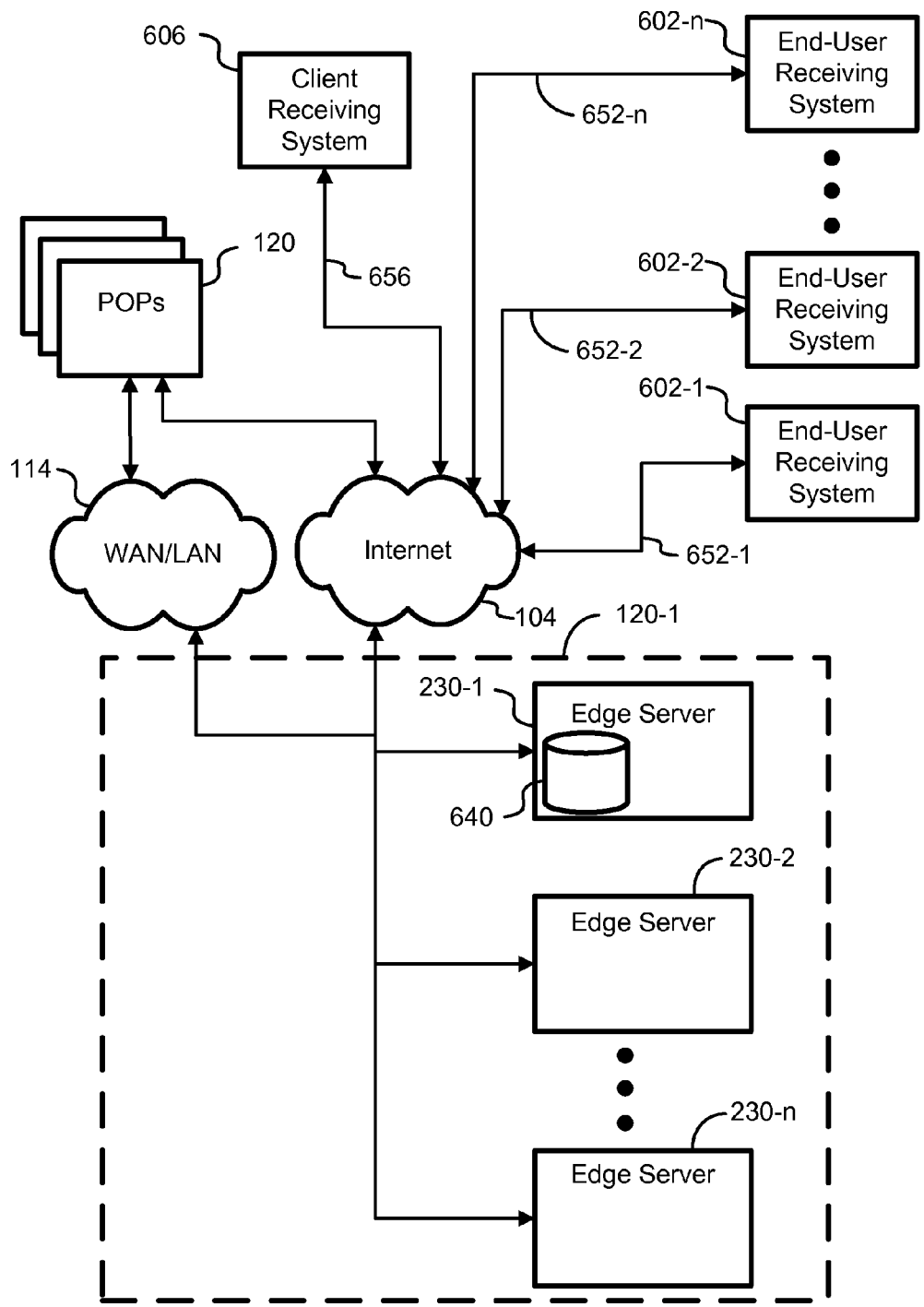

FIG. 6B depicts a block diagram of a specific content distribution system embodiment in which the packet size digest 640 is included in a single edge server 230-1. In this embodiment, the edge server 230-1 directly queries the packet size digest 640 and updates the packet size digest 640 with updated MTU information as it is discovered by edge server 230-1. Edge servers 230-2 to 230-n query the packet size digest 640 by sending queries to edge server 230-1. Edge servers 230-2 to 230-n transmit updates to the packet size digest to edge server 230-1, which maintains the packet size digest as the master. In some embodiments, edge server 230-1 does not serve content objects but instead serves as a back-end server for handling requests from various edge servers 230, such as to handle queries and updates to the packet size digest.

Figure 6C:
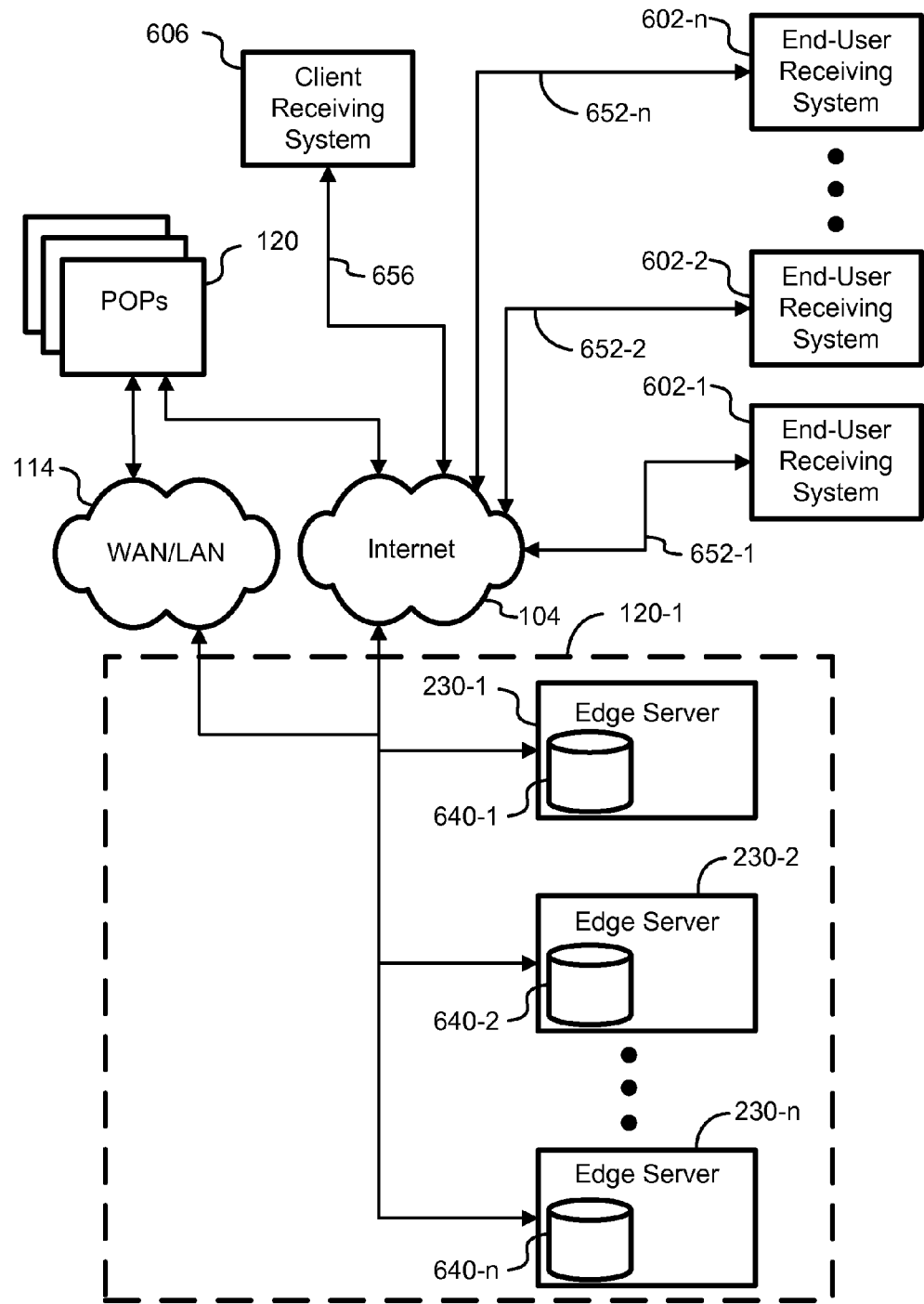

FIG. 6C depicts a block diagram of a specific content distribution system embodiment in which the packet size digest 640 is included in each edge server 230. In this embodiment, each edge server 230 directly queries the packet size digest 640 and updates the packet size digest 640 with updated MTU information as it is discovered. In embodiments, the packet size digest 640 is held in memory or stored on disk within each edge server 230. Updates to the packet size digests 640 are transmitted between edge servers 230, such as by using a gossip protocol to exchange the updates. In some embodiments, edge servers 230 can query one another to obtain a copy of the packet size digest 640, such as in the event that the copy of the packet size digest 640 within an edge server 230 becomes corrupt, inaccurate or is otherwise lost or unusable.

Figure 6D:
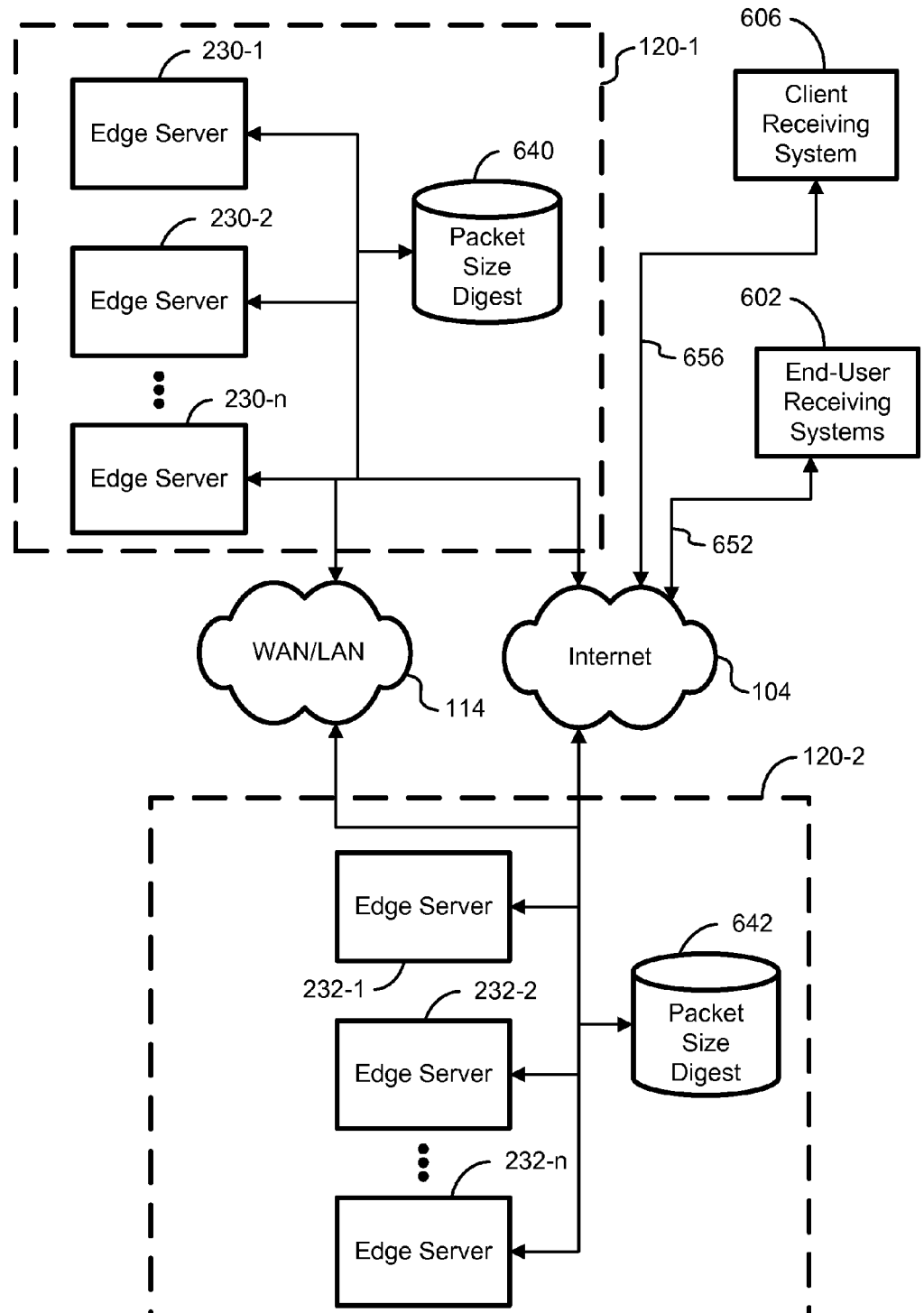

FIG. 6D depicts a block diagram of a specific content distribution system embodiment in which packet size digests are maintained in multiple POPs 120. As illustrated in FIG. 6D POP 120-1 includes packet size digest 640 and POP 120-2 includes packet size digest 642. Optionally, each POP 120 maintains its own independent packet size digest. In some embodiments, however, information from each packet size digest is shared between POPs. For example, it may be useful to share all or portions of a packet size digest when it is determined that portions of a network path between each POP 120 and a client receiving system 606 or end-user receiving systems 602 overlap, such as in a way that sharing MTU information about path 652 or path 656 is useful.

In some embodiments, packet size digest 642 is initialized with a copy of the information from packet size digest 640, but is thereafter maintained with updates discovered by only edge servers 232 but not with information discovered by edge servers 230. In this way, the packet size digest, for example configured as a linked list, can be pre-loaded with potentially useful information, although it may not be fully accurate for the connections between POP 120-2 and the various receiving systems, but can be updated with more accurate information as it is discovered.

For some embodiments, blocks of IP addresses that include non-default MTUs are included in a packet size digest. For example, if packet size digest path MTU (PMTU) entries for two or more IP addresses within a common subnet or having a common network prefix are identical, it may be determined or assumed that other IP addresses within that subnet or having that network prefix may also share the MTU. This can simplify the length of a packet size digest and can provide further insights as to which routes on the Internet have non-default MTUs. In addition, such assumptions or discovery of blocks of IP addresses having identical MTUs can prevent servers from having to re-discover this information each time a content object is served to a new IP address within the IP address block.

Table 1 provides an exemplary packet size digest, showing IP addresses, MTUs, time/date of initially identifying the MTU, time/date of last sending packets to the IP address, discovering POP and POPs utilizing the entry. Additional or fewer categories of data can be included in the packet size digest.

TABLE I

Sample Packet Size Digest

| Receiving System IP Address | MTU (bytes) | ID Date | Last Date | Discovering POP | Using POPs |
|---|---|---|---|---|---|
| 10.7.106.18 | 1492 | 2014 Apr. 22 | 2014 Apr. 30 | POP23 | POP4, POP23 |
| 70.15.3.3 | 1480 | 2011 Apr. 22 | 2011 Apr. 22 | POP7 | POP7 |
| 201.122.250.107 | 576 | 2012 Jun. 12 | 2014 Aug. 21 | POP18 | POP18 |
| 75.5.103.18-75.5.103.33 | 1280 | 2014 May 16 | 2014 Sep. 10 | POP9 | POP6-POP9 |
| 192.168.6.0/24 | 9000 | 2009 Jan. 1 | 2014 Sep. 10 | POP1 | * |
| 32.5.88.0/24-32.5.90.0/24 | 1400 | 2012 Aug. 23 | 2014 Sep. 10 | POP16 | POP16-POP22, POP28-POP37 |

In Table I, for example, the entry for 192.168.6.0/24 may correspond to network devices within a LAN, such as servers within a POP or within various POPs in the content delivery network, where network address translation (NAT) allows multiple network devices to share the same public IP address while each is assigned a private IP address. As will be understood by the skilled artisan, the IP address of 192.168.6.0/24 may correspond to all IP addresses between 192.168.6.1 and 192.168.6.255. In addition, some specialized networks, such as a local area network within a content delivery network, may utilize non-standard sized MTUs to allow for enhanced data transmission efficiency. For example, the entry of 9000 bytes for the MTU for IP addresses 192.168.6.0/24 may correspond to an Ethernet Jumbo Frame.

In some embodiments, information in a packet size digest that is of a certain age may be expunged, though, in general, packet size digests of other embodiments are perpetual. Optionally, servers may re-confirm entries in a packet size digest, such as by sending packets larger than a non-default MTU and confirming whether the packets are received by their intended recipient. In some situations, one or more non-default MTU size packets are sent to a receiving system to investigate whether the MTU has changed. For example, an investigation of this nature may be performed if the age of the packet size digest entry is over a specific time period or if the last time the packet size digest entry was used is before a specific date.

Figure 7:
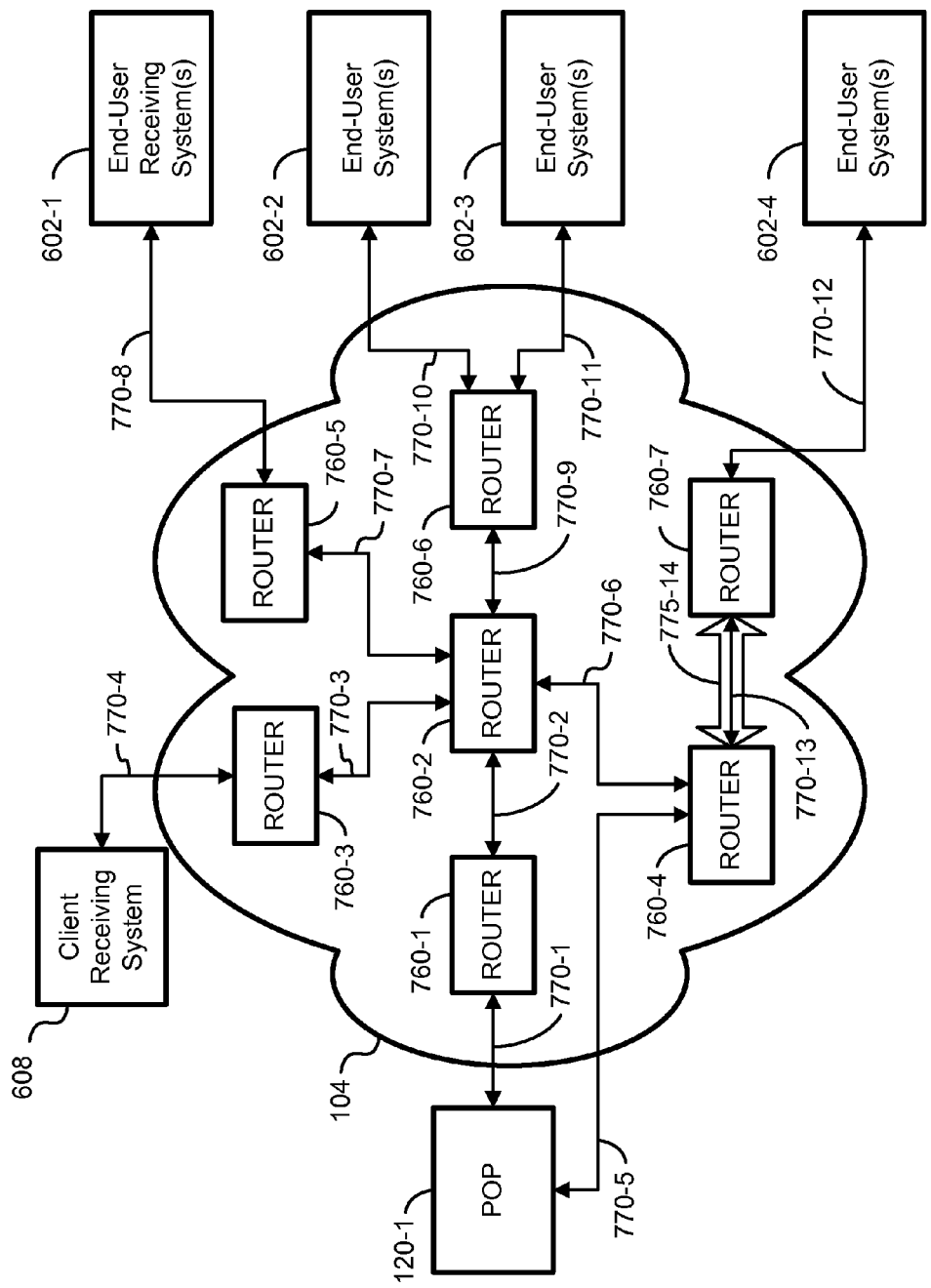
FIG. 7 depicts a block diagrams of an internetwork embodiment.

FIG. 7 depicts a block diagram of an internetwork embodiment. Here, various routers 760 make up the internetwork links 770 between POP 120-1 and client receiving system 608 and end-user receiving systems 602. For example, in the embodiment shown, a network path from POP 120-1 to client receiving system 608 may pass through routers 760-1, 760-2 and 760-3, such that packets of data pass through network links 770-1, 770-2, 770-3 and 770-4. Other paths, however, are possible, including a path that passes through routers 760-4, 760-2 and 760-3 in which packets of data pass through network links 770-5, 770-6, 770-3 and 770-4. In addition, there may be intermediate routers, not shown, between routers 760 depicted in FIG. 7 that make up portions of network links 770 and other network links may exist between routers other than those illustrated. As illustrated, if network link 770-2, for example, has a non-standard MTU, such as an MTU smaller than 1500 bytes, any packets from POP 120-1 to any of client receiving system 608 and end-user receiving systems 602 that pass through router 760-1 and network links 770-1 and 770-2 will be required to use the non-standard MTU.

In the illustrated embodiment, router 760-5 provides connectivity to end-user receiving system 602-1 through network links 770-7 and 770-8, router 760-6 provides connectivity to end-user receiving system 602-2 through network links 770-9 and 770-10 and router 760-6 provides connectivity to end-user receiving system 602-3 through network links 770-9 and 770-11. If router 760-6 or network link 770-9 has a non-default MTU all packets from POP 120-1 to end-user systems 602-2 and 602-3 will need to use the non-default MTU of router 760-6 or network link 770-9 in order for the packets to be successfully be received by the end-user systems 602-2 and 602-3. In such an embodiment, a block of network addresses, such as encompassing end-user systems 602-2 and 602-3, may be constructed and added to a packet size digest in POP 120-1.

As illustrated in FIG. 7, router 760-7 and network link 770-12 provide connectivity to end-user system 602-4. In addition, network link 770-13 between routers 760-4 and 760-7 is illustrated as a tunneled route within network link 775-14. For example, in one embodiment, network link 775-14 may be an IPv6 link and network link 770-13 may be an encapsulated IPv4 link. In another embodiment, network link 775-14 may be an IPv4 link and network link 770-13 may be an encapsulated IPv6 link. Such a tunneling configuration may be a common source of a non-default MTU for a network path to a receiving system.

Figure 8:
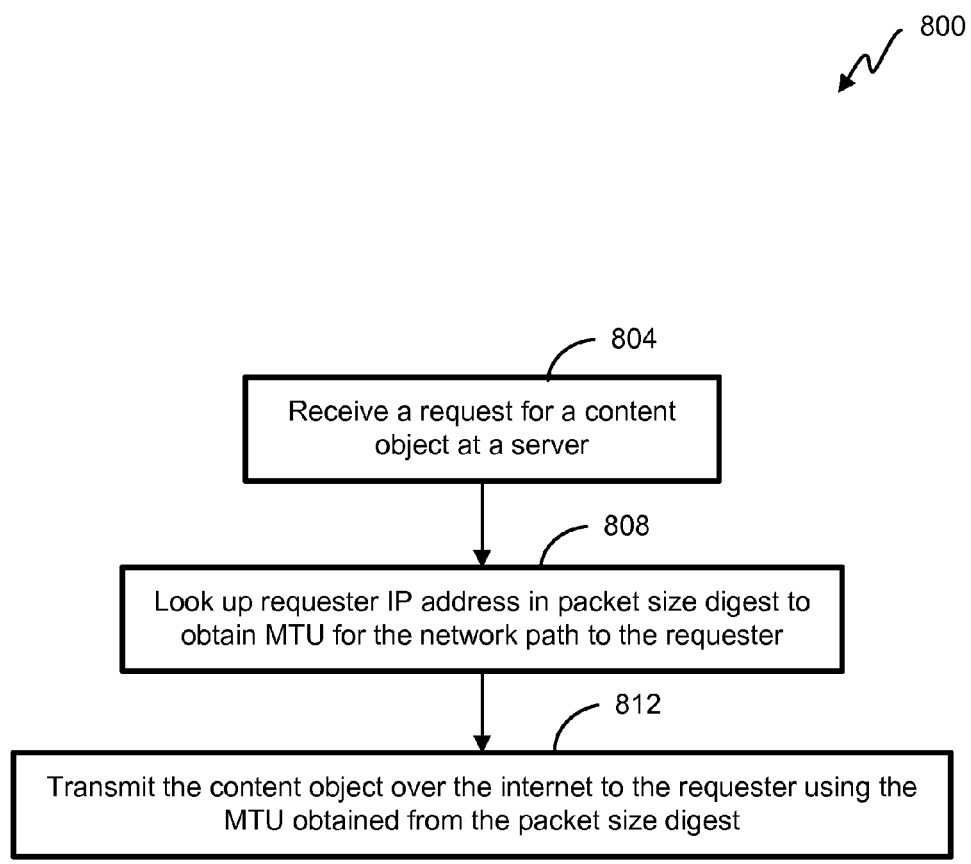
FIG. 8 illustrates a flowchart of an embodiment of a process for delivering a content object over the Internet.

FIG. 8 illustrates a flowchart of an embodiment of a process 800 for delivering a content object over the Internet. Initially, at 804, a request for a content object is received at a server. For example, the content object may be a webpage or component thereof or may be a media object, such as streaming or on demand video or audio. The IP address of the requester is looked up in the packet size digest, at 808, to determine an appropriate MTU for sending the packets including the content object. In embodiments, if no entry is included for the IP address, the default MTU is used. Once the appropriate MTU is obtained from the packet size digest, the content object is transmitted, at 812, over the Internet to the requesting system.

Figure 9:
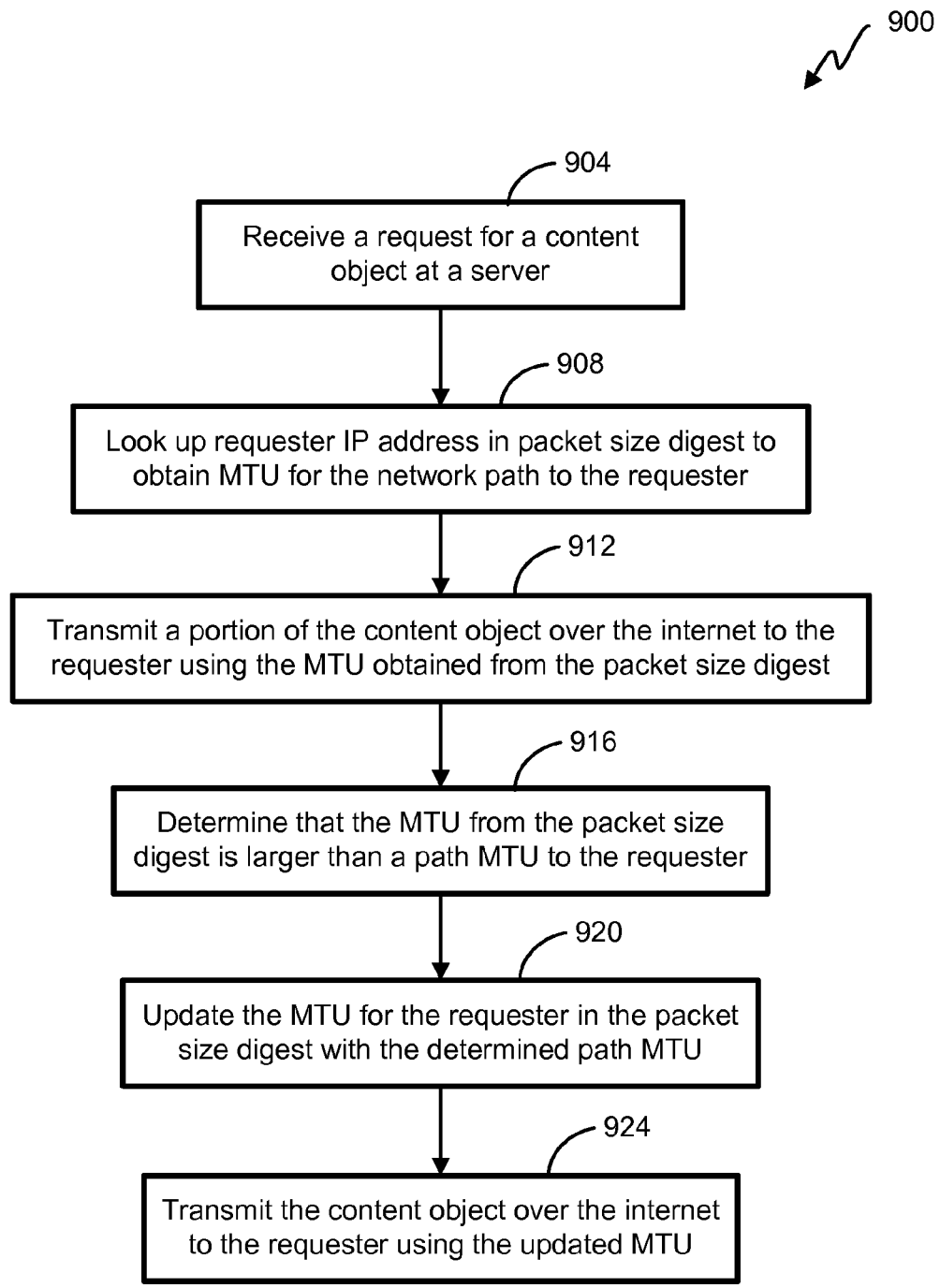
FIG. 9 illustrates a flowchart of an embodiment of a process for delivering a content object over the Internet.

FIG. 9 illustrates a flowchart of an embodiment of a process 900 for delivering a content object over the Internet. Initially, at 904, a request for a content object is received at a server. The IP address of the requester is looked up in the packet size digest, at 908, to determine an appropriate MTU for sending the packets including the content object. The MTU is obtained from the packet size digest and the content object is transmitted, at 912, over the Internet to the requesting system. In this embodiment, the packets are dropped or otherwise do not reach the requesting system because they have a size larger than the actual MTU for the path to the requesting system. Such a situation may happen, for example, if the initial MTU used is a default MTU and the network path to the requesting system is only capable of supporting a smaller, non-default MTU. Thus, it is determined, at 916, that the MTU from the packet size digest is larger than the actual path MTU to the requester. Next, at 920, the packet size digest MTU for the requester IP address is updated with the actual path MTU to the requester. The content object is then transmitted, at 924, using the updated MTU.

Figure 10:
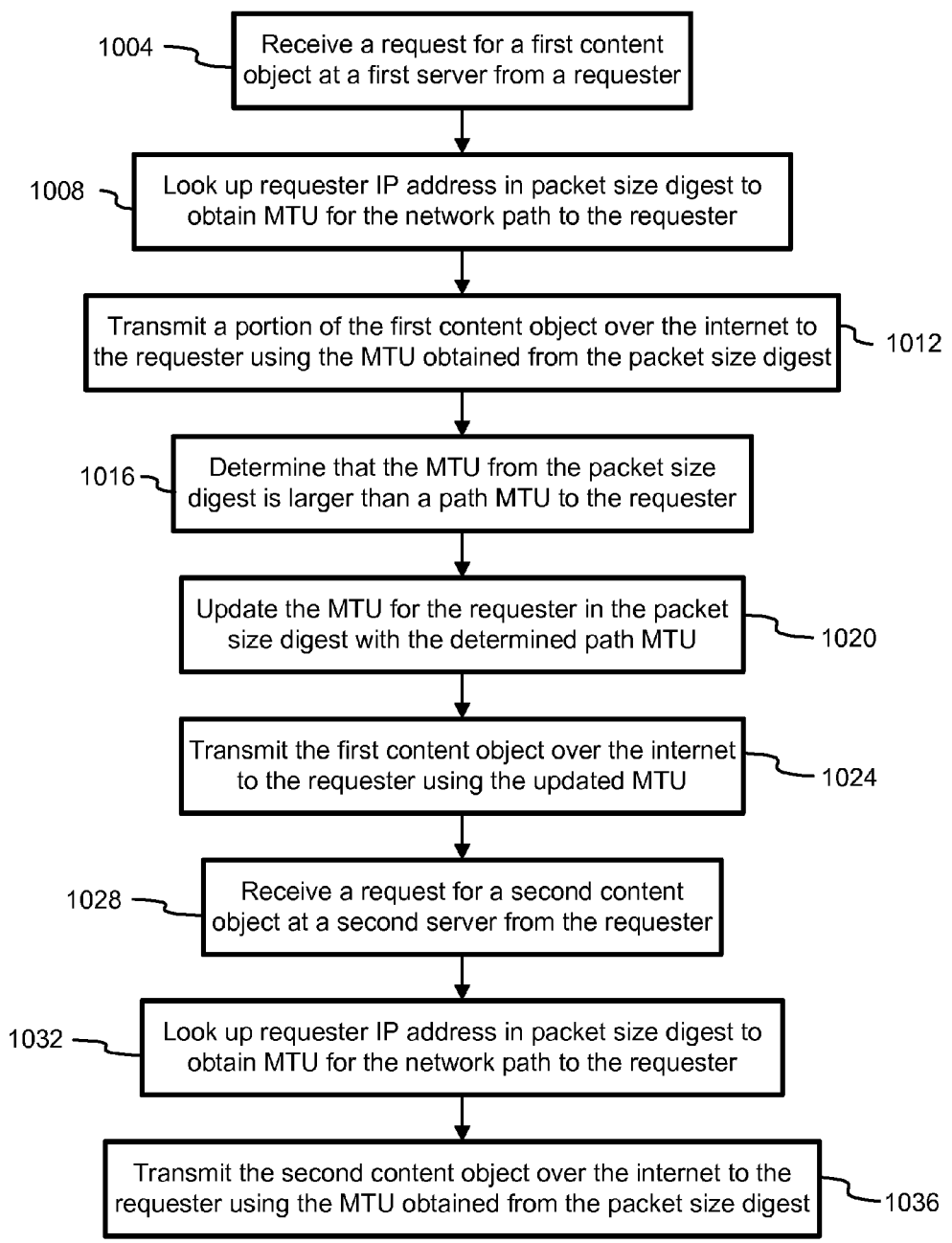
FIG. 10 illustrates a flowchart of an embodiment of a process for delivering content objects over the Internet.

FIG. 10 illustrates a flowchart of an embodiment of a process 1000 for delivering content objects over the Internet. Initially, at 1004, a request for a first content object is received at a first server. The IP address of the requester is looked up in the packet size digest, at 1008, to determine an appropriate MTU for sending the packets including the content object. The MTU is obtained from the packet size digest and the first content object is transmitted, at 1012, over the Internet to the requesting system. In this embodiment, the packets are dropped or otherwise do not reach the requesting system because they have a size larger than the actual MTU for the path to the requesting system. Such a situation may happen, for example, if the initial MTU used is a default MTU and the network path to the requesting system is only capable of supporting a non-default MTU. Thus, it is determined, at 1016, that the MTU from the packet size digest is larger than the actual path MTU to the requester. Next, at 1020, the packet size digest MTU for the requester IP address is updated with the actual path MTU to the requester. The first content object is then transmitted, at 1024. At some time later, a request for another content object is received at a second server from the same requester, at 1028. The requester's IP address is looked up in the packet size digest, at 1032, by the second server to obtain the MTU for the path to the requester, and the second content object is transmitted, at 1036, to the requester by the second server using the MTU from the packet size digest. In this way, use of the packet size digest can prevent the second and subsequent servers having access to the packet size digest from having to determine that the default MTU is too large by transmitting packets of a size too large for transmission to the requester and incurring the delays associated with the lost packets and packet retransmission.

Figure 11:
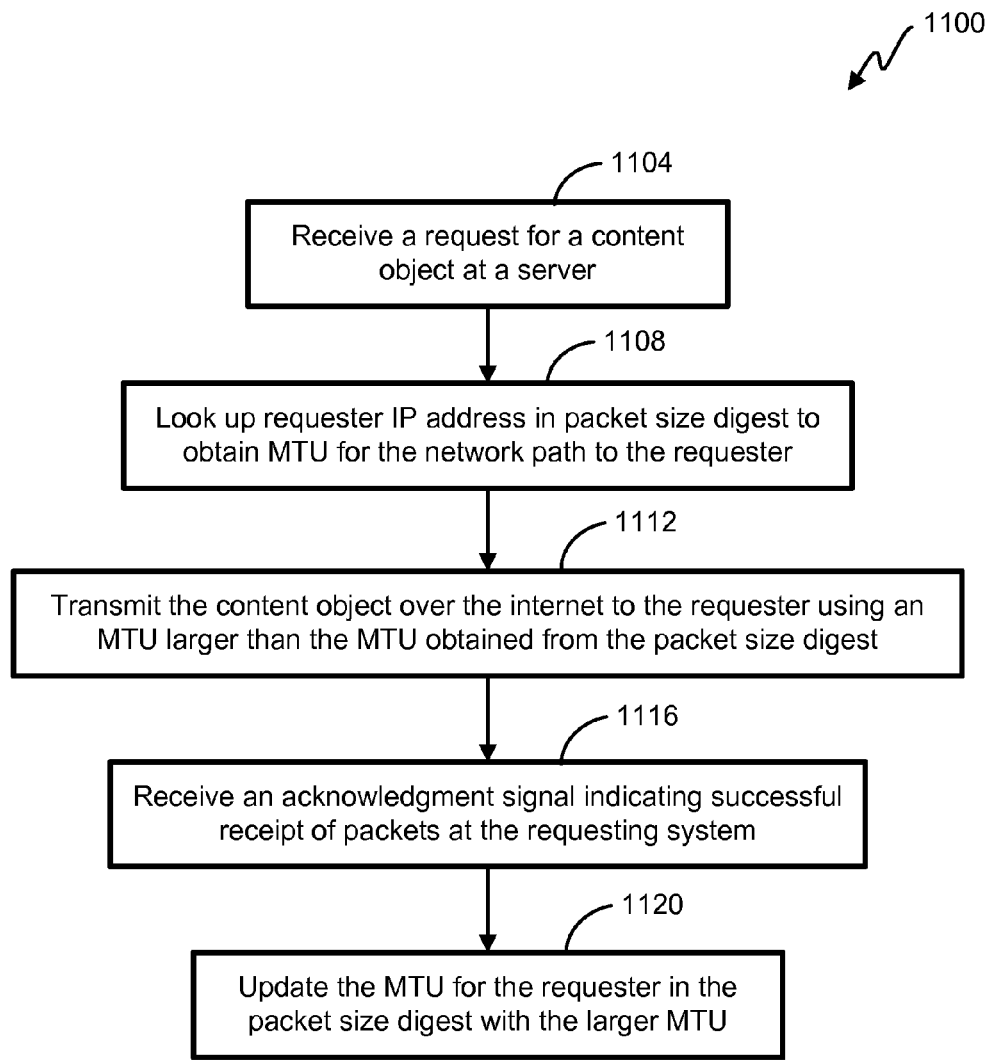
FIG. 11 illustrates a flowchart of an embodiment of a process for delivering a content object over the Internet.

FIG. 11 illustrates a flowchart of an embodiment of a process 1100 for delivering a content object over the Internet. This embodiment entails sending packets of a size larger than the MTU listed in the packet size digest in order to verify if the entry is correct. Initially, at 1104, a request for a content object is received. At 1108, the requester IP address is looked up in the packet size digest to obtain an appropriate MTU. Next, at 1112, the content object is transmitted using a packet size larger than the MTU obtained from the packet size digest. If the transmission is successful, at 1116, acknowledgement signals will be received from the requesting system indicating that the packets were successfully received. Following successful transmission of packets larger than the MTU in the packet size digest, the MTU entry for the requester's IP address will be updated with the MTU used successfully. In some embodiments, such a situation may occur, for example, if the age of the MTU entry in the packet size digest is over a specific threshold. For example, a threshold value of 1 year may be utilized. In this case, an MTU entry that has not been verified in over 1 year may be tested to ensure it is still accurate. Other time durations may be used.

Figure 12:
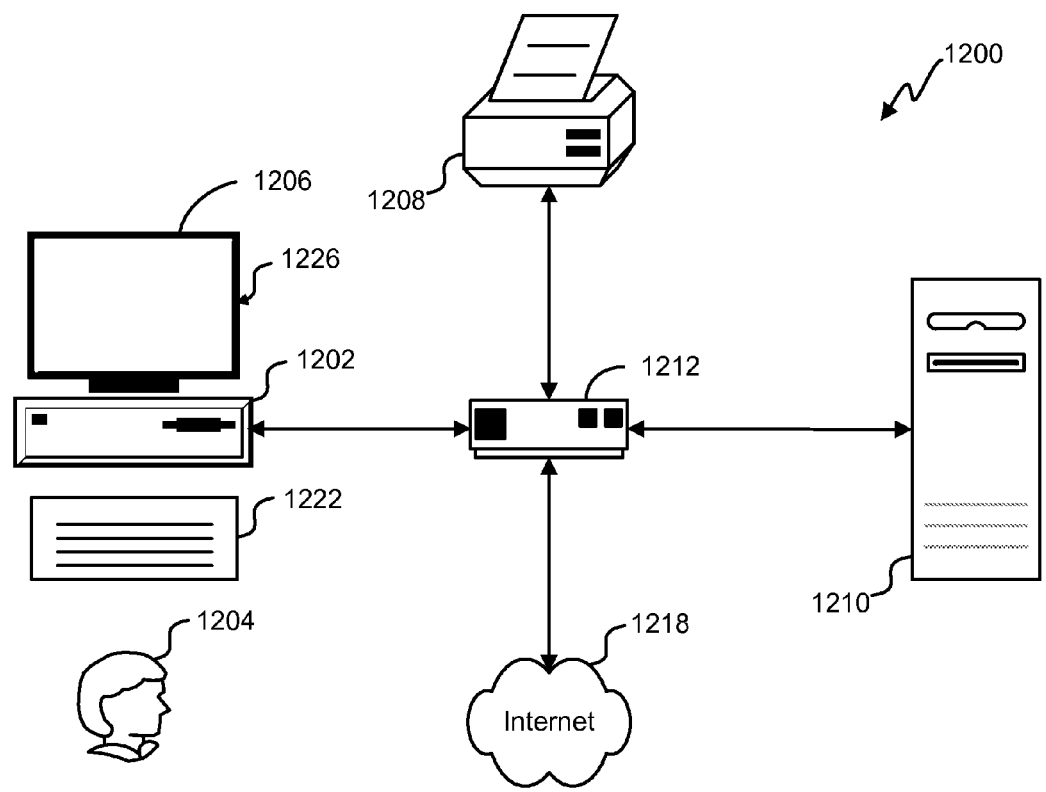
FIG. 12 depicts a block diagram of an embodiment of a computer system.

Referring next to FIG. 12, an exemplary environment with which embodiments may be implemented is shown with a computer system 1200 that can be used by a designer 1204 to design, for example, electronic designs. The computer system 1200 can include a computer 1202, keyboard 1222, a network router 1212, a printer 1208, and a monitor 1206. The monitor 1206, processor 1202 and keyboard 1222 are part of a computer system 1226, which can be a laptop computer, desktop computer, handheld computer, mainframe computer, etc. The monitor 1206 can be a CRT, flat screen, etc.

A designer 1204 can input commands into the computer 1202 using various input devices, such as a mouse, keyboard 1222, track ball, touch screen, etc. If the computer system 1200 comprises a mainframe, a designer 1204 can access the computer 1202 using, for example, a terminal or terminal interface. Additionally, the computer system 1226 may be connected to a printer 1208 and a server 1210 using a network router 1212, which may connect to the Internet 1218 or a WAN.

The server 1210 may, for example, be used to store additional software programs and data. In one embodiment, software implementing the systems and methods described herein can be stored on a storage medium in the server 1210. Thus, the software can be run from the storage medium in the server 1210. In another embodiment, software implementing the systems and methods described herein can be stored on a storage medium in the computer 1202. Thus, the software can be run from the storage medium in the computer system 1226. Therefore, in this embodiment, the software can be used whether or not computer 1202 is connected to network router 1212. Printer 1208 may be connected directly to computer 1202, in which case, the computer system 1226 can print whether or not it is connected to network router 1212.

Figure 13:
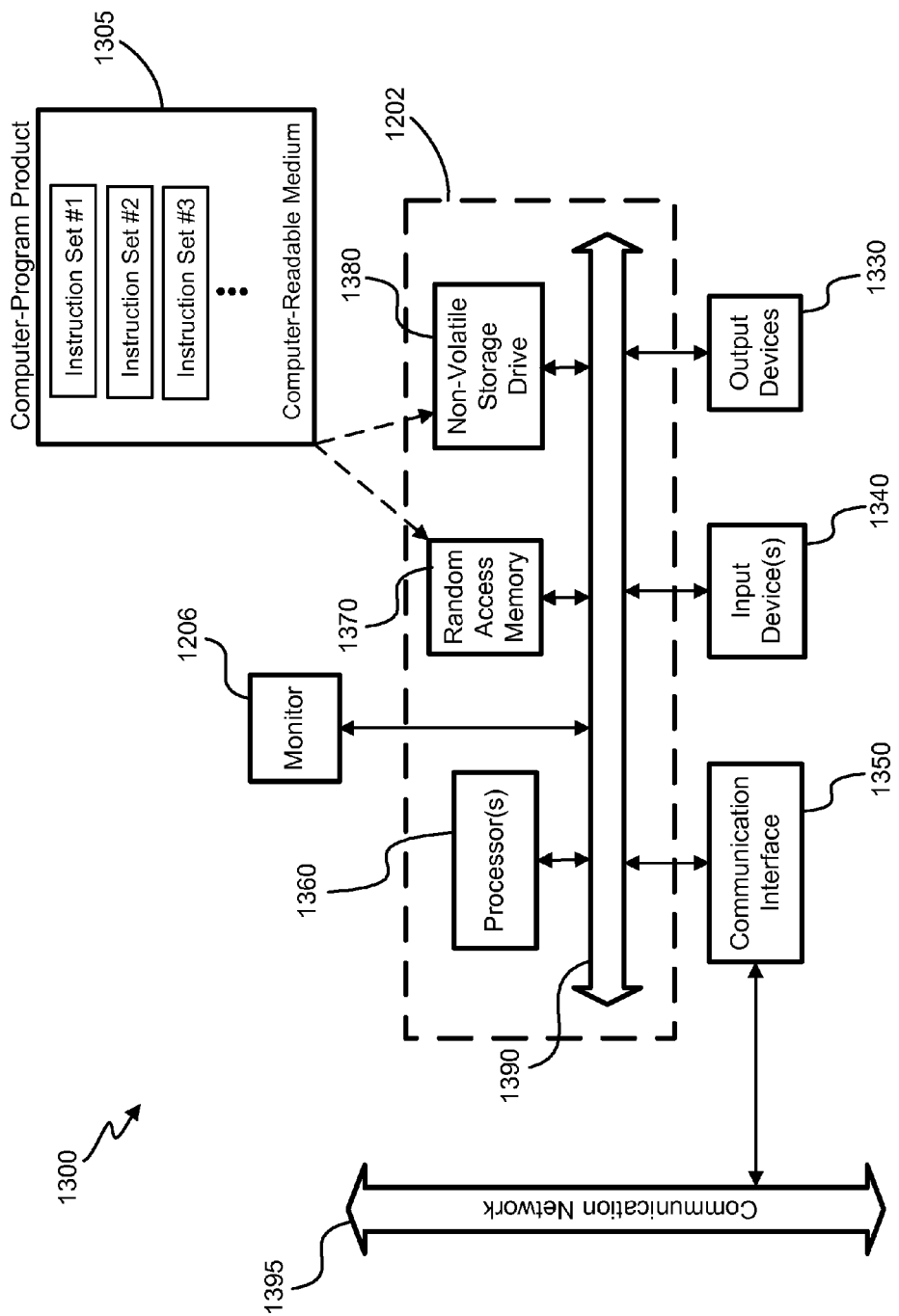
FIG. 13 depicts a block diagram of an embodiment of a special-purpose computer system.

With reference to FIG. 13, an embodiment of a special-purpose computer system 1300 is shown. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 1226, it is transformed into the special-purpose computer system 1300.

Special-purpose computer system 1300 comprises a computer 1202, a monitor 1206 coupled to computer 1202, one or more additional user output devices 1330 (optional) coupled to computer 1202, one or more user input devices 1340 (e.g., keyboard, mouse, track ball, touch screen) coupled to computer 1202, an optional communications interface 1350 coupled to computer 1202, a computer-program product 1305 stored in a tangible computer-readable memory in computer 1202. Computer-program product 1305 directs system 1300 to perform the above-described methods. Computer 1202 may include one or more processors 1360 that communicate with a number of peripheral devices via a bus subsystem 1390. These peripheral devices may include user output device(s) 1330, user input device(s) 1340, communications interface 1350, and a storage subsystem, such as random access memory (RAM) 1370 and non-volatile storage drive 1380 (e.g., disk drive, optical drive, solid state drive), which are forms of tangible computer-readable memory.

Computer-program product 1305 may be stored in non-volatile storage drive 1380 or another computer-readable medium accessible to computer 1202 and loaded into memory 1370. Each processor 1360 may comprise a microprocessor, such as a microprocessor from Intel® or Advanced Micro Devices, Inc.®, or the like. To support computer-program product 1305, the computer 1202 runs an operating system that handles the communications of product 1305 with the above-noted components, as well as the communications between the above-noted components in support of the computer-program product 1305. Exemplary operating systems include Windows® or the like from Microsoft Corporation, Solaris® from Sun Microsystems, LINUX, UNIX, and the like.

User input devices 1340 include all possible types of devices and mechanisms to input information to computer system 1202. These may include a keyboard, a keypad, a mouse, a scanner, a digital drawing pad, a touch screen incorporated into the display, audio input devices such as voice recognition systems, microphones, and other types of input devices. In various embodiments, user input devices 1340 are typically embodied as a computer mouse, a trackball, a track pad, a joystick, wireless remote, a drawing tablet, a voice command system. User input devices 1340 typically allow a user to select objects, icons, text and the like that appear on the monitor 1206 via a command such as a click of a button or the like. User output devices 1330 include all possible types of devices and mechanisms to output information from computer 1202. These may include a display (e.g., monitor 1206), printers, non-visual displays such as audio output devices, etc.

Communications interface 1350 provides an interface to other communication networks and devices and may serve as an interface to receive data from and transmit data to other systems, WANs and/or the Internet 1218. Embodiments of communications interface 1350 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1350 may be coupled to a computer network, to a FireWire® bus, or the like. In other embodiments, communications interface 1350 may be physically integrated on the motherboard of computer 1202, and/or may be a software program, or the like.

RAM 1370 and non-volatile storage drive 1380 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices and the like. RAM 1370 and non-volatile storage drive 1380 may be configured to store the basic programming and data constructs that provide the functionality of various embodiments of the present invention, as described above.

Software instruction sets that provide the functionality of the present invention may be stored in RAM 1370 and non-volatile storage drive 1380. These instruction sets or code may be executed by the processor(s) 1360. RAM 1370 and non-volatile storage drive 1380 may also provide a repository to store data and data structures used in accordance with the present invention. RAM 1370 and non-volatile storage drive 1380 may include a number of memories including a main random access memory (RAM) to store of instructions and data during program execution and a read-only memory (ROM) in which fixed instructions are stored. RAM 1370 and non-volatile storage drive 1380 may include a file storage subsystem providing persistent (non-volatile) storage of program and/or data files. RAM 1370 and non-volatile storage drive 1380 may also include removable storage systems, such as removable flash memory.

Bus subsystem 1390 provides a mechanism to allow the various components and subsystems of computer 1202 communicate with each other as intended. Although bus subsystem 1390 is shown schematically as a single bus, alternative embodiments of the bus subsystem may utilize multiple busses or communication paths within the computer 1202.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc., may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that include or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system for delivering content objects from a content delivery network to receiving systems over an Internet, comprising:
   a first edge server, wherein:
      the first edge server is one of a first plurality of edge servers in a first point of presence of the content delivery network;
      the content delivery network includes a plurality of points of presence distributed geographically; and
      the content delivery network delivers content over the Internet to receiving systems;
   a second edge server, wherein:
      the second edge server is one of a second plurality of edge servers in a second point of presence of the content delivery network; and
   a first cache of the first edge server that stores a first digest including maximum packet sizes for network paths to receiving systems,
   a second cache of the second edge server that stores a second digest including maximum packet sizes for network paths to receiving systems, wherein:
   the first edge server is configured to:
      receive a first request to deliver a first content object to a first receiving system;
      query the first digest;
      receive a first result identifying a first packet size for a first network path to the first receiving system;
      transmit the first content object over the Internet to the first receiving system using the first packet size for the first network path to the first receiving system;
      determine that the first packet size for the first network path to the first receiving system is larger than a first network path maximum packet size; and
      update an entry in the packet size digest for the first network path to the first receiving system with the first network path maximum packet size; and
   the second edge server is configured to:
      query the first edge server to request information from the first digest;
      update the second digest with the information from the first digest;
      receive a second request to deliver a second content object to a second receiving system;
      query the second digest;
      receive a second result identifying a second packet size for a second network path to the second receiving system; and
      transmit the second content object over the Internet to the second receiving system using the second packet size for the second network path to the second receiving system.

2. The system of claim 1, wherein the digest is configured to:
   receive queries from multiple servers for maximum packet sizes for network paths to receiving systems;
   provide results to multiple servers for maximum packet sizes for network paths to receiving systems; and
   receive updates from multiple servers of maximum packet sizes for network paths to receiving systems.

3. The system of claim 1, wherein the second receiving system and the first receiving system are a same receiving system and wherein the second packet size is the first network path maximum packet size.

4. The system of claim 1, wherein the second receiving system and the first receiving system are part of a common subnet such that the first network path and the second network path at least partially overlap at a network node that is only capable of transmitting packets having a size less than or equal to the first network path maximum packet size and wherein the digest includes an entry indicating the first network path maximum size for a block of receiving systems that are part of the common subnet.

5. The system of claim 1, wherein the digest includes maximum packet sizes for network paths from the same point of presence to receiving systems.

6. The system of claim 1, wherein the first edge server is configured to update the entry in the packet size digest for the first network path to the first receiving system in response to receiving a message indicating the first packet size is larger than the first network path maximum packet size or receiving a message indicating the first packet size requires fragmentation.

7. The system of claim 1, wherein the first edge server is configured to share packet size updates to the digest with one or more of the first plurality of edge servers in the first point of presence of the content delivery network and one or more of the second plurality of edge servers in the second point of presence of the content delivery network.

8. The system of claim 1, further comprising:
a third edge server, wherein: the third edge server is one of the first plurality of edge servers in the first point of presence of the content delivery network; and
the third edge server is configured to:
receive a third request to deliver a third content object to a third receiving system;
query the digest;
receive a third result identifying a third packet size for a third network path to the third receiving system;
transmit the third content object over the Internet to the third receiving system using a fourth packet size larger than the third packet size for the third network path to the third receiving system;
receive an acknowledgment for successful transmission of packets of the third content object over the third network path to the third receiving system using the fourth packet size; and update an entry in the packet size digest for the third network path to the third receiving system with the fourth packet size.

9. A method for delivering content objects from a content delivery network to receiving systems over an Internet, the method comprising:
receiving a first request to deliver a first content object to a first receiving system, wherein:
the first request is received at a first edge server;
the first edge server is one of a first plurality of edge servers in a first point of presence of a content delivery network;
the content delivery network includes a plurality of points of presence distributed geographically; and
the content delivery network delivers content over the Internet to receiving systems;
querying, by the first edge server, a first digest including maximum packet sizes for network paths to receiving systems;
receiving, by the first edge server, a first result that identifies a first packet size for a first network path to the first receiving system;
transmitting, by the first edge server, the first content object over the Internet to the first receiving system using the first packet size for the first network path to the first receiving system;
determining, by the first edge server, that the first packet size for the first network path to the first receiving system is larger than a first network path maximum packet size;
updating, by the first edge server, an entry in the digest for the first network path to the first receiving system with the first network path maximum packet size;
receiving a second request to deliver a second content object to a second receiving system, wherein:
the second request is received at a second edge server;
the second edge server is one of a second plurality of edge servers in a second point of presence of the content delivery network;
querying, by the second edge server, to retrieve a portion of the first digest;
updating, by the second edge server, a second digest with the portion of the first digest;
querying, by the second edge server, the second digest;
receiving, by the second edge server, a second result from the second digest that identifies a second packet size for a second network path to the second receiving system; and
transmitting, by the second edge server, the second content object over the Internet to the second receiving system using the second packet size for the second network path to the second receiving system.

10. The method of claim 9, wherein the first digest:
receives queries from multiple edge servers for maximum packet sizes for network paths to receiving systems;
provides results to multiple edge servers for maximum packet sizes for network paths to receiving systems; and
receives updates from multiple edge servers for changes to maximum packet size entries for network paths to receiving systems.

11. The method of claim 9, wherein the second receiving system and the first receiving system are a same receiving system and wherein the second packet size is the first network path maximum packet size.

12. The method of claim 9, wherein the second receiving system and the first receiving system are part of a common subnet such that the first network path and the second network path at least partially overlap at a network node that is only capable of transmitting packets having a size less than or equal to first network path maximum packet size and wherein the first digest includes an entry indicating the first network path maximum size for a block of receiving systems that are part of the common subnet.

13. The method of claim 9, wherein the first digest includes maximum packet sizes for network paths from one or both of the first point of presence or the second point of presence to receiving systems.

14. The method of claim 9, wherein determining that the first packet size for the first network path to the first receiving system is larger than the first network path maximum packet size includes receiving no acknowledgement for transmission of a packet larger than the first network path maximum packet size.

15. The method of claim 9, wherein updates to the first digest are shared among one or more of the first plurality of edge servers in the first point of presence of the content delivery network and one or more of the second plurality of edge servers in the second point of presence of the content delivery network.

16. The method of claim 9, wherein the first digest is stored in a cache of one or more of the first plurality of edge servers in the first point of presence of the content delivery network and one or more of the second plurality of edge servers in the second point of presence of the content delivery network.

17. The method of claim 9, further comprising:
receiving a request to deliver a third content object to a third receiving system, wherein:
the request is received at a third edge server;
the third edge server is one of the first plurality of edge servers in the first point of presence of the content delivery network;

querying, by the third edge server, the first digest;
receiving, by the third edge server, a third result that identifies a third packet size for a third network path to the third receiving system;
transmitting, by the third edge server, the third content object over the Internet to the third receiving system using a fourth packet size larger than the third packet size for the third network path to the third receiving system;
receiving, by the third edge server, an acknowledgment for successful transmission of packets of the third content object over the third network path to the third receiving system using the fourth packet size; and
updating, by the third edge server, an entry in the first digest for the third network path to the third receiving system with the fourth packet size.

18. A computer-program product tangibly embodied in a non-transitory machine-readable storage medium, comprising instructions that, when executed by one or more processors in a computing device, cause the computing device to:
receive a first request to deliver a first content object over an Internet to a first receiving system;
query a first digest that perpetually tracks maximum packet sizes for network paths to receiving systems;
receive a first result that identifies a first packet size for a first network path to the first receiving system;
transmit the first content object over the Internet to the first receiving system using the first packet size for the first network path to the first receiving system;
determine that the first packet size for the first network path to the first receiving system is larger than a first network path maximum packet size;
update an entry in the first digest for the first network path to the first receiving system with the first network path maximum packet size;
query a second digest that perpetually tracks maximum packet sizes for network paths to receiving systems; and
updating the first digest with the results of the query from the second digest.

19. The computer-program product of claim 18, wherein the instructions further comprise instructions configured to cause the computing device to: receive a second request to deliver a second content object over the Internet to a second receiving system;
query the first digest;
receive a second result that identifies a second packet size for a second network path to the second receiving system; and
transmit the second content object over the Internet to the second receiving system using the second packet size for the second network path to the second receiving system.

20. The computer-program product of claim 18, wherein the instructions configured to cause the computing device to update an entry in the first digest for the first network path to the first receiving system with the first network path maximum packet size further include causing the computing device to:
receive queries to the first digest from multiple servers for maximum packet sizes for network paths to receiving systems;
provide results from the first digest to multiple servers for maximum packet sizes for network paths to receiving systems; and
receive updates to the first digest from multiple servers of maximum packet sizes for network paths to receiving systems.

* * * * *